United States Patent [19]

Fukasawa et al.

[11] Patent Number: 5,128,097
[45] Date of Patent: Jul. 7, 1992

[54] REACTOR CORE, FUEL ASSEMBLY AND FUEL SPACER

[75] Inventors: Yukihisa Fukasawa; Akira Nishimura; Junichi Yamashita; Michihiro Ozawa, all of Hitachi, Japan

[73] Assignee: Hitachi, Ltd., Tokyo, Japan

[21] Appl. No.: 449,916

[22] PCT Filed: Jun. 7, 1989

[86] PCT No.: PCT/JP89/00582
 § 371 Date: Dec. 14, 1989
 § 102(e) Date: Dec. 14, 1989

[30] Foreign Application Priority Data

Jun. 8, 1988 [JP] Japan ................. 63-139313

[51] Int. Cl.⁵ .................................. G21C 3/34
[52] U.S. Cl. ........................ 376/438; 376/434; 376/446; 376/448
[58] Field of Search ............... 376/434, 438, 444, 446, 376/448

[56] References Cited

U.S. PATENT DOCUMENTS

| | | | |
|---|---|---|---|
| 4,111,594 | 9/1978 | Sforza | 415/1 |
| 4,255,236 | 3/1981 | Robbins | 376/209 |
| 4,285,771 | 8/1981 | Downs | 376/438 |
| 4,585,614 | 4/1986 | Helmersson | 376/434 |
| 4,714,585 | 12/1987 | Kast | 376/442 |
| 4,863,680 | 9/1989 | Sakurada et al. | 376/444 |
| 4,968,479 | 11/1990 | Ogiya et al. | 376/428 |

FOREIGN PATENT DOCUMENTS 61-165682 7/1986 Japan .

*Primary Examiner*—Brooks H. Hunt
*Assistant Examiner*—Meena Chelliah
*Attorney, Agent, or Firm*—Antonelli, Terry, Stout & Kraus

[57] ABSTRACT

Herein disclosed is a reactor core including a plurality of fuel assemblies having a plurality of fuel rods. In a central region of the transverse section of the fuel assembly, a plurality of fuel rods are arranged in the form of a square lattice. In the peripheral region surrounding the central region, a plurality of fuel rods are arranged in the form of triangular lattice. The pitch of the fuel rods arranged in the square lattice form is equal to that of the fuel rods arranged in the triangular lattice form. With the arrangement of the fuel rods in the triangular lattice form in the peripheral region, the ratio of the moderator to the fuel of the peripheral region is smaller than that of the central region. As a result, the local power peaking drops. Since the arrangement of the fuel rods is partially in the triangular lattice form, the pitch of the fuel rods can be increased to augment the MCPR.

20 Claims, 17 Drawing Sheets

| FUEL ROD NUMBER | 1 | 2 | 3 |
| --- | --- | --- | --- |
| | (50) | (6) | (14) |

FUEL ROD   4
NUMBER

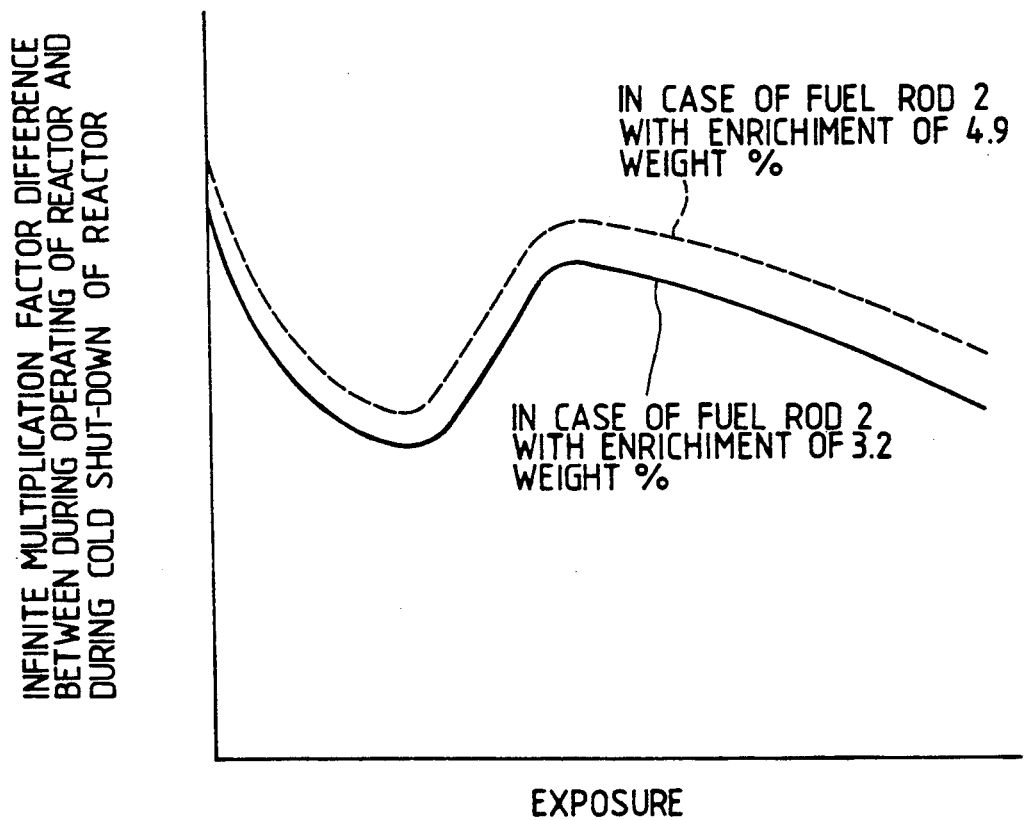

REACTOR CORE, FUEL ASSEMBLY AND FUEL SPACER

TECHNICAL FIELD

The present invention relates to a reactor core, a fuel assembly and a fuel spacer and, more particularly, to a reactor core, a fuel assembly and a fuel spacer which find their suitable applications to a boiling water reactor.

BACKGROUND ART

As a fuel assembly for fuel burn-up extension, there has been proposed the structure which is shown in FIGS. 1 and 7 of Japanese Patent Laid-Open No. 217186/1987. This fuel assembly is arranged at its central portion with two water rods of large diameter and therearound with a number of fuel rods. This fuel assembly has its seven fuel rods replaced by the two larger water rods. With this structure, the fuel economy can be improved because the number of fuel rods replaced by the water rods is small. Moreover, the fuel assembly can reduce a local power peaking.

Another structure for the fuel assembly of high burn-up exposure is disclosed in Japanese Patent Laid-Open No. 202386/1985. This fuel assembly has its fuel rods arrayed at a small pitch at its peripheral portion. The structure shown in FIG. 3 of Japanese Patent Laid-Open No. 202386/1985 will be described in the following. In this fuel assembly, two water rods are arranged at the central portion whereas fuel rods and water rods are arranged in the form of a square lattice so that the pitch of the fuel rods is large at the central portion where the utilization of thermal neutrons is low but is high at the peripheral portion where the utilization of thermal neutrons is high. The small pitch of the fuel rods in the peripheral portion improves the average utilization of thermal neutrons of the fuel assembly, thus leading to the high burn-up exposure of the fuel assembly.

DISCLOSURE OF INVENTION

A first object of the present invention is to provide a reactor core and a fuel assembly which have the minimum critical power ratio increased and the local power peaking decreased.

A second object of the present invention is to provide a fuel assembly which has a fuel economy improved.

A third object of the present invention is to provide a fuel assembly which has a core shut-down allowance augmented.

A fourth object of the present invention is to provide a fuel assembly which can prevent the fuel inventory from decreasing and can increase the slowing-down region in a water rod.

A fifth object of the present invention is to provide a fuel assembly which can prevent the fretting corrosion of two water rods to decrease the local power peaking.

A sixth object of the present invention is to provide a fuel assembly which holds a fuel spacer easily with the water rods.

A seventh object of the present invention is to provide a fuel spacer which can facilitate the arrangement of fuel rods to augment the minimum critical power ratio and decrease the critical power peaking.

An eighth object of the present invention is to provide an initial inventory core extending a discharged exposure.

The first object of the present invention can be achieved by forming a fuel assembly with a central region arranged with a plurality of fuel rods in the form of a square lattice and a peripheral region arranged with a plurality of fuel rods in the form of a triangular lattice and surrounding the central region.

Since the square lattice arrangement of the fuel rods at the central region and the triangular lattice arrangement of the fuel rods at the peripheral region are used together in the fuel assembly, the amount of fuel substance in the vicinity of the periphery is augmented. As a result, the high power in the vicinity of the periphery is decreased to reduce the local power peaking. Since, moreover, the combination of the square lattice arrangement and the triangular lattice arrangement of the fuel rods can equalize the pitches of the fuel rods at the central region and the peripheral region, thus leading to an augmentation of the minimum critical power ratio (which will be shortly referred to as "MCPR").

The object of the present invention can be achieved by arranging two water rods adjacent to each other in the central region such that the total cross-sectional area of the slowing-down region in the water rods is seven to twelve times as large as the cross-sectional area of the fuel rods.

It is the most preferable for the fuel economy that the total cross-sectional area of the slowing-down region in the water rods is seven to twelve times as large as the cross-sectional area of the fuel rods.

The requisite for achieving the third object of the present invention is to make the infinite multiplication factor of the first fuel rods arranged adjacent to the two water rods smaller than that of the other or second fuel rods arranged adjacent to the first fuel rods.

If the amount of the coolant around the first fuel rods is increased to reduce the size of the first fuel so as to reduce the infinite multiplication factor of the first fuel rods, a wider cooling water passage is formed there around than that of the other fuel rods so that the heat value of the aforementioned adjacent fuel rods can be suppressed. As a result, the change in the void content of the wide cooling water passage between the power run and the cold shut-down is decreased to augment the reactor shut-down allowance.

The third object of the present invention can be achieved if the shortest distance l between the axis of the fuel rods arranged at the outermost periphery and the inner face of a channel box satisfies the following formula:

$$l > 2.6t + P/2,$$

wherein:
P: the pitch of the fuel rods; and
t: the thickness of a band around the fuel spacer.

For $l > 2.6t + P/2$, the increase in the distance between the outermost fuel rods and the inner face of the channel box, which is caused by the arrangement of the triangular lattice of the fuel rods can be utilized for increasing the coolant region in the periphery in the fuel assembly. As a result, the coolant region in the periphery in the fuel assembly is augmented to augment the reactor shut-down allowance.

The fourth embodiment of the present invention can be achieved if the above-specified shortest distance l satisfies the following formula:

$$l \leq 2.6t + P/2.$$

The aforementioned distance increment obtained by satisfying the formula can be utilized by enlarging the pitch of the fuel rods. As a result, the diameter of the fuel rods can be augmented to compensate the reduction in fuel inventory following the triangular lattice arrangement. Moreover, the external diameter of the water. rods can be enlarged.

The fifth object of the present invention can be achieved by binding the two adjacent water rods by binding means.

The vibrations of the water rods following the flowing vibrations of the coolant can be suppressed by binding the two adjacent water rods. This prevents the fretting corrosion from occurring.

The sixth object of the present invention can be achieved: by providing a fuel spacer having a plurality of cylindrical members, in which the fuel rods are inserted, and space holding members, which are attached to the cylindrical members adjacent to the two water rods and contact with the individual water rods; and by equipping with one of the water rods with a support member for supporting the space holding members.

Since the space holding members contacting with the water rods are supported by the support member attached to the water rod, the fuel spacer can be easily held.

The sixth object can also be achieved by providing a fuel spacer having a plurality of cylindrical members, in which the fuel rods are inserted, and a fuel spacer support member which is attached to the cylindrical member facing the water rod and supported by a binding member attached to the water rod.

The fuel spacer can be easily held by the binding means for binding the two water rods.

The seventh object of the present invention can be achieved by forming a central region, in which a plurality of cylindrical members for receiving the fuel rods are arranged in the form of a square lattice, and a peripheral region in which a plurality of cylindrical members for receiving the fuel rods are arranged in the form of a triangular lattice and which surrounds the central region.

Since the fuel spacer is equipped with both the cylindrical members arranged in the square lattice form and the cylindrical members arranged in the triangular lattice form, the fuel rods can be easily arranged in the square lattice form and the triangular lattice form.

The eighth embodiment of the present invention can be achieved by loading the reactor core with a plurality of fuel assemblies each having a central region arranged with a plurality of fuel rods in the form of a square lattice and a peripheral region arranged with a plurality of fuel rods in the form of a triangular lattice and surrounding the central region.

Since the reactor core is loaded with the fuel assemblies having the fuel rods arranged in the square and triangular lattice forms.

BRIEF DESCRIPTION OF DRAWINGS

FIG. 14 is a characteristic diagram showing the change in the difference of the infinite multiplication factor between the power run and the cold shut-down against the degree of burn-up;

BEST MODE FOR CARRYING OUT THE INVENTION

Figure 1:
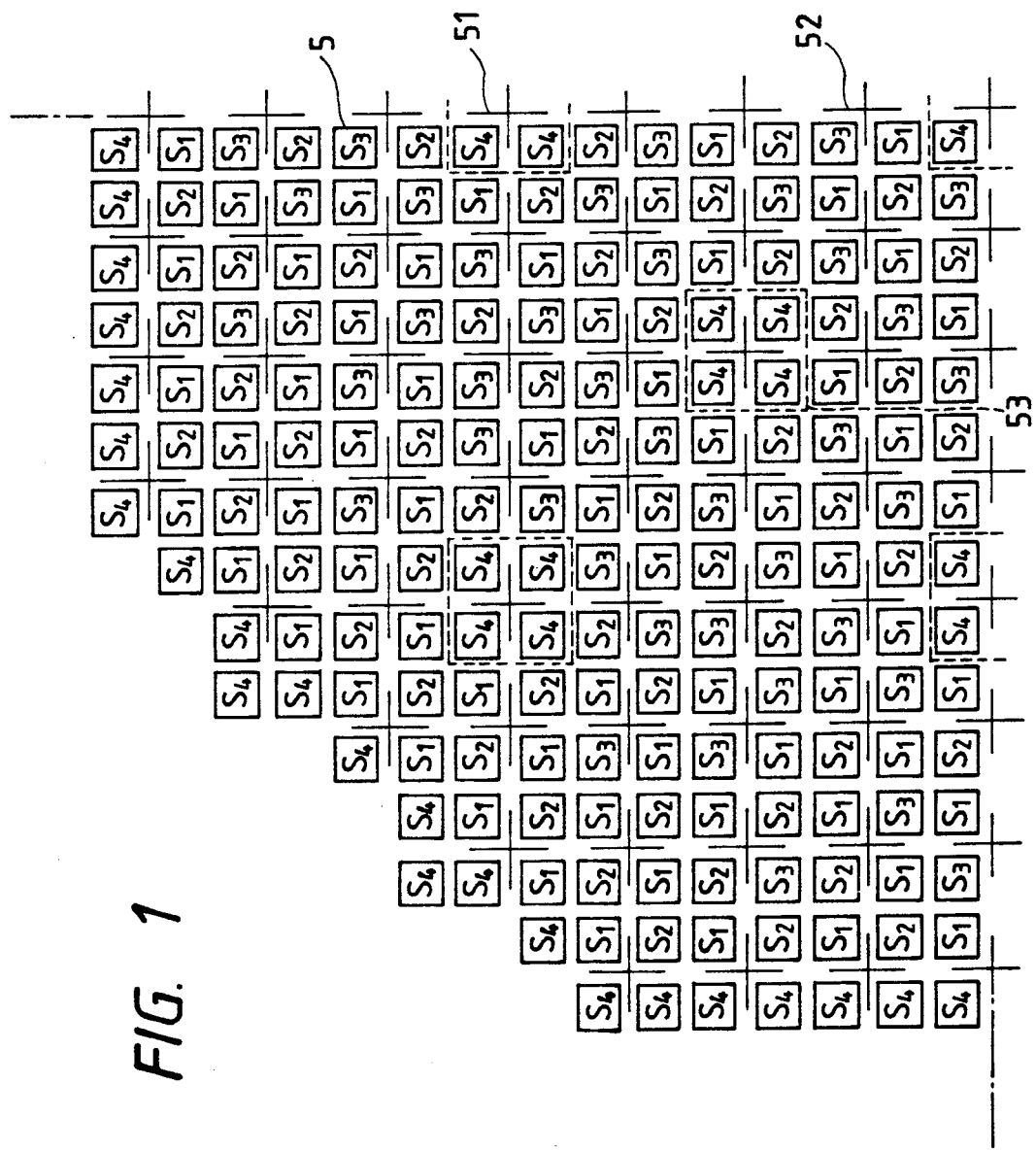
FIG. 1 is a transverse section showing one fourth of the core of a reactor according to one embodiment of the present invention applied to a boiling water reactor.

It is desired at present to further extend discharged exposure of the fuel assembly. From this desired, we have examined the fuel assembly capable of extended discharged exposure on the basis of that shown in FIGS. 1 and 7 of Japanese Patent Laid-Open No. 217186/1987. What was examined at first is to enhancement the average enrichment of the above-specified fuel assembly. The increase in the average enrichment will enhance discharged exposure of the fuel assembly to a high level but will raise a problem of the increment of the local power peaking in the fuel assembly.

In the later process of various examinations, we also have tried to apply the concept shown in FIG. 3 and so on of Japanese Patent Laid-Open No. 202386/1985 to the structure shown in FIGS. 1 and 7 of Japanese Patent Laid-Open No. 217186. In the structure shown in FIG. 7 of Japanese Patent Laid-Open No. 217186/1987, for example, our trial proposes a fuel assembly in which the pitch of the fuel rods at the central portion is large whereas the pitch of the fuel rods at the peripheral portion is small. Even in the fuel assembly shown in FIG. 7 of the Japanese Patent Laid-Open No. 217186/1987, like the Japanese Patent Laid-Open No. 202386/1985, the thermal neutron utilization is improved on average of the fuel assembly by changing the pitch of the fuel rods at each region, as described above. As a result, such fuel assembly can also attain a high discharged exposure. However, this fuel assembly has a severe limit to the MCPR. This is caused by the fact that the small pitch of the fuel rods drops the critical power (of the fuel assembly), at which a transition takes place from a nucleate boiling of excellent heat transfer characteristics to a film boiling of bad heat transfer characteristics. The MCPR is the minimum value of the ratio of the above-specified critical power to the actual power and implies the allowance to the film boiling. Incidentally, the critical power is defined for the fuel rod by which the film boiling is caused at first.

We have further examined a new proposal of the problem obtained by the foregoing examinations and have reached a conclusion that the fuel assembly has its central region arranged with the fuel rods in the form of a square lattice and its peripheral region arranged with the fuel rods in the form of a triangular lattice. The embodiments of the present invention thus obtained will be described in the following.

A reactor core according to one suitable embodiment of the present invention applied to the boiling water reactor will be described in the following with reference to FIG. 1.

The boiling water reactor core of the present embodiment is constructed by arranging a number of fuel assemblies in a lattice form. Reference numerals 51 and 52 designate control rods. FIG. 1 shows the core of a boiling water reactor in the 1,100 MWe class. This core is composed of a plurality of cells each having four fuel assemblies 5 arranged adjacent to and around one control rod. Reference characters $S_1$ to $S_4$ appearing in FIG. 1 designate fuel cycle numbers which will be experienced by the fuel assemblies 5 in a certain fuel cycle. The fuel assembly 5 of the number $S_1$ will experience the first fuel cycle operation in a certain fuel cycle. Likewise, the fuel assembly 5 of the number $S_2$ will experience the second fuel cycle operation in the fuel cycle The fuel assembly 5 of the number $S_3$ will experience the third fuel cycle operation in the fuel cycle The fuel assembly 5 of the number $S_4$ will experience the fourth fuel cycle operation in the fuel cycle. One fuel cycle means the operating period of the reactor from the start of the operation of the reactor after the end of the fuel replacement to the reactor shut-down for a subsequent fuel shuttling. The fuel assembly 5 of the number $S_1$ experiences the first operation when loaded in the core. One fuel assembly 5 usually experiences three or four fuel cycle runs till it comes to the end of its lifetime and is removed as the used one from the core. In the present embodiment, seven hundred and sixty four fuel assemblies 5 are charged in the core. The control rod 51 has a function to adjust the reactivity (i.e., the power of the reactor) when it is inserted into the core for the ordinary operation. The control rod 52 is extracted from the core at the start of the reactor so that it is not inserted into the core during the ordinary operation, and is inserted into the core when the reactor is shut down. The control rod 51 is inserted into a control cell 53 which is composed of four fuel assemblies 5 of the number $S_4$. These fuel assemblies 5 of the number of $S_4$ have a low reactivity because they have already experienced the operation in the three fuel cycles. The core equipped with the control cell 53 is disclosed in U.S. Pat. No 4,460,538 and U.S. Pat. No. 4,378,329 (which corresponds to Japanese Patent Laid-Open No. 1386/1981).

The structure of the fuel assembly will be described in the following with reference to FIGS. 2, 3, 4 and 6.

The fuel assembly 5 is composed of seventy fuel rods 6, an upper tie plate 7, a lower tie plate 8, water rods 9, a fuel spacer 10 and a channel box 13.

The upper tie plate 7 and the lower tie plate 8 hold the upper and lower end portions of the fuel rods 6, respectively. The fuel spacer 10 holds the spacing of the adjacent two of the seventy fuel rods 6 within a predetermined range. The fuel rods 6 are charged with a number of fuel pellets. The channel box 13 is a cylinder having a generally square transverse section. The channel box 13 is attached to the upper tie plate 7 to surround the bundle of the fuel rods bound by the fuel spacer 10. The two water rods 9 are arranged at the central portion of the transverse section of the fuel assembly 5. These two water rods 9 are arranged at the central portion of the fuel assembly 5, i.e., on a diagonal line joining a pair of opposed corners of the channel box 13 and adjacent to each other.

The fuel rods 6 arranged in the fuel assembly 5 are classified into three kinds 1 to 3. The fuel rods 1 to 3 have individual enrichments and concentrations of gadolinium or burnable poison, as shown in FIG. 3. Specifically, the fuel rod 1 has an enrichment of 4.9 wt. %; the fuel rod 2 has an enrichment of 3.2 wt. %; and the fuel rod 3 has an enrichment of 4.5 wt. %. These enrichments of the fuel rods 1 to 3 are uniform at the above-specified values all over the lengths in the axial direction of the effective fuel length portions (i.e., the axial length of the region charged with the fuel pellets). The fuel rod 3 contains 4.5 wt. % of gadolinium. This gadolinium is also contained uniformly all over the axial length of the fuel rod 3. The aforementioned enrichments of the fuel assembly 5 take values before loaded in the core, i.e., when exposure is zero (of a new fuel assembly just produced). This fuel rods 1 to 3 have an equal axial length at their effective fuel length portions. The fuel rods 1 to 3 have an external diameter of about 10.9 mm. The fuel rods 1 to 3 are charged with the fuel pellets which are prepared by sintering uranium dioxide in a sealed coated tube. The two fuel rods 2 are arranged adjacent to the two water rods 9 and opposed to each other across the water rods 9. More specifically, the two fuel rods 2 are arranged adjacent to the two water rods 9 and on one diagonal line of the fuel assembly perpendicular to the straight line joining the axes of the two water rods 9 so that they are equidistantly spaced from the axes of the two water rods 9.

Figure 2:
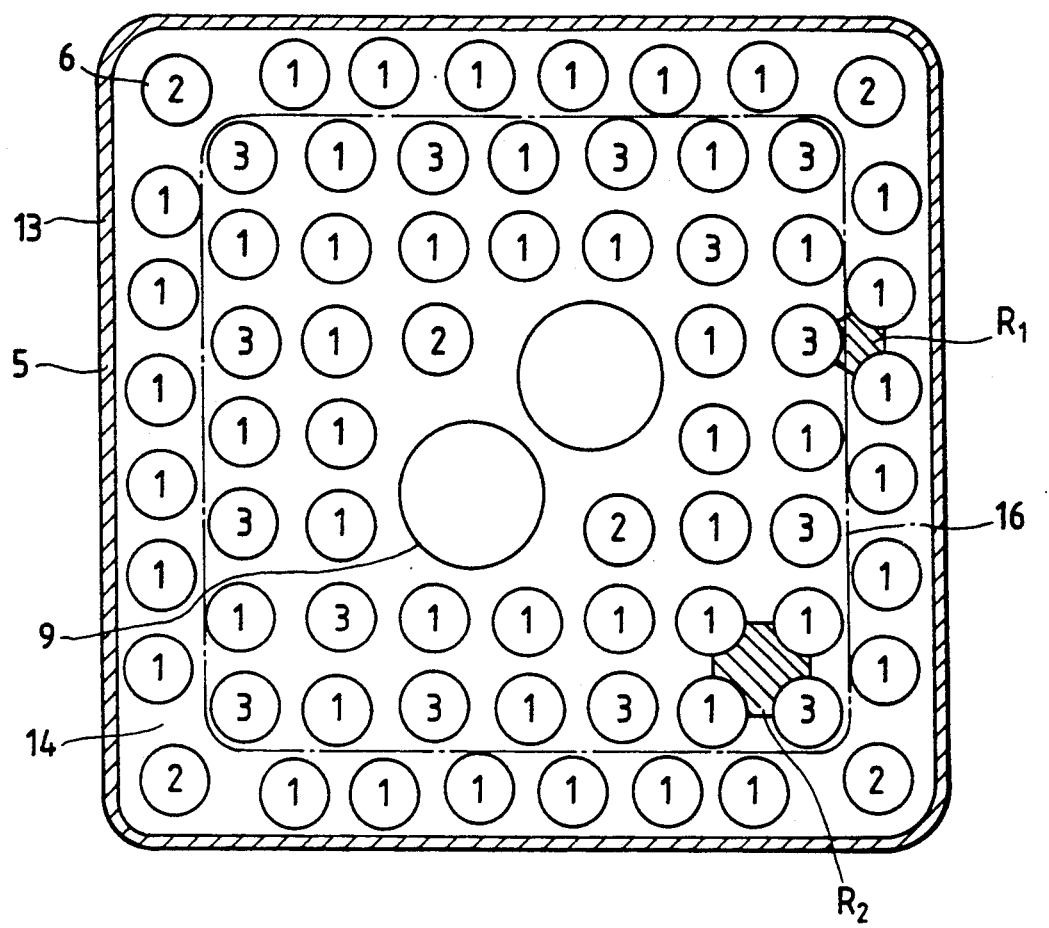
FIG. 2 is a transverse section showing a fuel assembly shown in FIG. 1.

In the fuel assembly 5, as is apparent from FIG. 2, the fuel rods 6 are arranged in the form of a square lattice (e.g., tetragonal lattice) at the central region (i.e., the region within a single-dotted line 16 in the present embodiment) of the transverse section. In the fuel assembly 5, moreover, the fuel rods 6 are arranged in the form of a triangular lattice at the peripheral region (i.e., the region outside of the single-dotted line 16 and arranged with the substantially outermost fuel rods 6 of the fuel assembly 5 in the present embodiment) of the transverse section.

The aforementioned array of the fuel rods will be described in detail in the following. In the central region, the fuel rods 6 are arranged in the form of a square lattice of seven rows and seven columns. These fuel rods 6 surround the two water rods 9 which are arranged at the center portion of the central region. In the center portion of the central region, the two water rods 9 are arranged obliquely and adjacent to each other in an area, in which the fuel rods 6 can be arranged in the form of a square lattice of three rows and three columns. In the opposed two corners in the area capable of being arranged with the fuel rods in three rows and three columns, the fuel rods 2 are arranged adjacent to the two water rods 9. The two water rods 9 are arranged in the areas in which seven fuel rods 6 can be arranged in the form of a square lattice having the same pitch as that of the fuel rods 6 arrayed in the central area. In other words, the two water rods 9 are arranged in the fuel assembly 5 as if they were substituted by the seven fuel rods 6 (i.e., the fuel rods positioned, as indicated at X in FIG. 5). The fuel rods 3 are arranged in the central region but not in the peripheral region.

Figure 5:
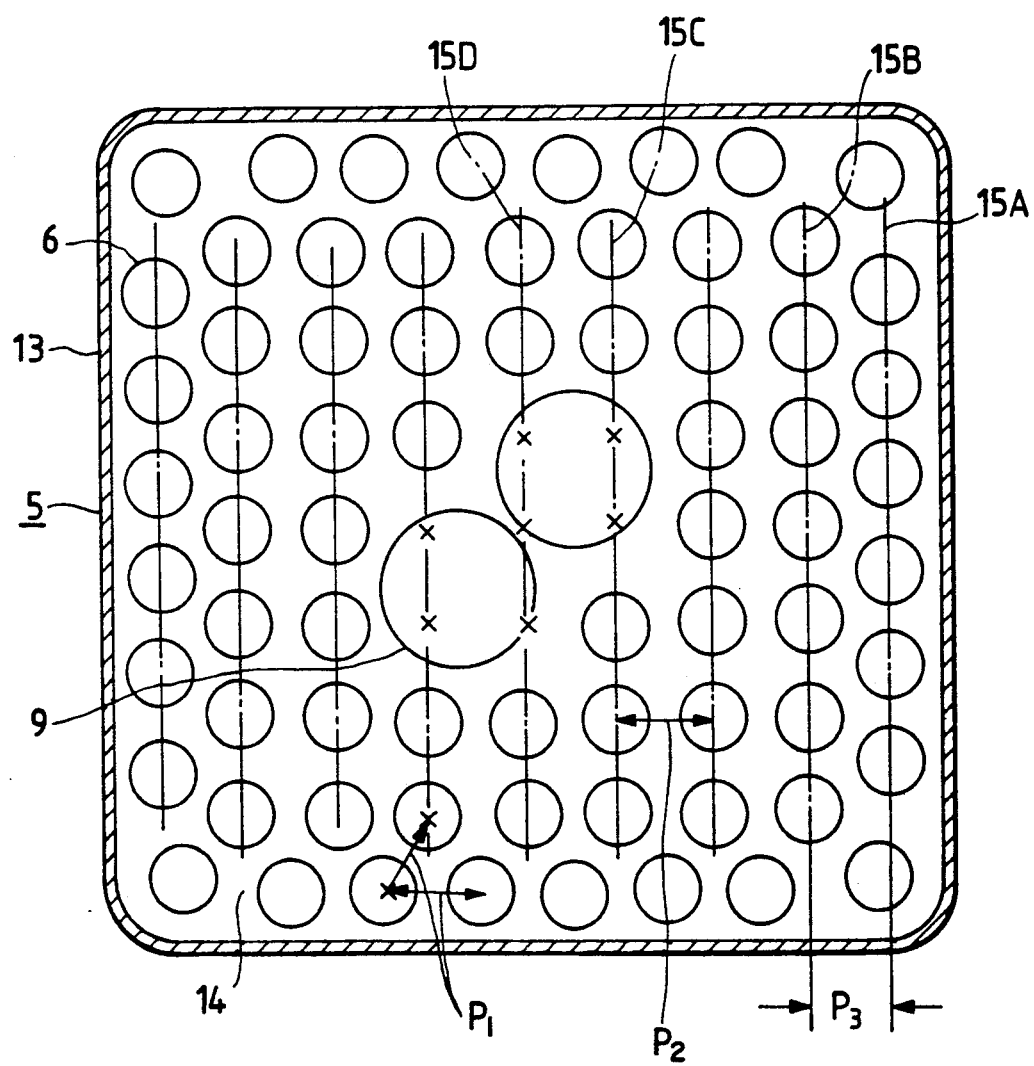
FIG. 5 is an explanatory diagram showing the array of the fuel rods of FIG. 2.

Twenty eight fuel rods 6 are arranged in the peripheral region. Excepting the fuel rods (i.e., the fuel rods 2 in the present embodiment) positioned at the corners of the fuel assembly 5 in the peripheral region, the fuel rods 6 (i.e., the fuel rods 1 in the present embodiment) in the peripheral region are arranged in the form of a triangular lattice with respect to the fuel rods 6 arranged in the outermost periphery in the central region. The array pitch $P_1$ (as shown in FIG. 5) of the fuel rods 6 in the triangular lattice is equal to the array pitch $P_2$ (as also shown in FIG. 5) of the fuel rods 6 in the square lattice. The pitch between the fuel rods 2 arranged at the corners of the peripheral region and the fuel rods 3 arranged in the central region and adjacent to the fuel rods 2 is equal to the pitch $P_1$ and $P_2$. On the contrary, however, the pitch between the fuel rods 2 positioned at the corners of the peripheral region and the fuel rods 1 arranged in the peripheral regon and adjacent to the fuel rods 2 is larger than the pitch $P_1$ and $P_2$. As a result, a wide space 14 is established at the corners of the fuel assembly 5 and between the fuel rods 1 and the fuel rods 2.

Between one and opposed faces of the channel box 13, as described above, the fuel rods 6 are arranged such that the spacings between them are dense at the side of the inner face (i.e., at the side of the periphery of the fuel assembly 5) of the channel box 13 and coarse at the side of the axis (i.e., the central side of the fuel assembly 5) of the fuel assembly 5. In other words, the fuel assembly 5 has an array of nine columns of fuel rods between one and opposed faces of the channel box 13, as indicated by the single-dotted line in FIG. 5. This array is also made similarly in a direction perpendicular to that indicated by single-dotted lines. The spacing (i.e., the spacing $P_3$ between the outermost fuel rod array 15A and the second-layered fuel rod array 15B) between the fuel rod arrays at the peripheral side of the fuel assembly 5 is made narrower than the spacing (i.e., the spacing between fuel rod array 15C and 15D) between the fuel rod arrays at the central side of the fuel assembly 5. In the present embodiment, all the spacing between the fuel rod arrays in the central region are equal. As a result, the flow area (i.e., the area $R_1$ of FIG. 2) of a cooling water passage to be formed among the adjacent three fuel rods 6 arranged in the triangular lattice form is smaller than the flow area (i.e., the area $R_2$ of FIG. 2) of a cooling water passage to be formed among the four adjacent fuel rods 6 arranged in the square lattice form. Moreover, the regions (i.e., the regions arranged with the fuel rods 6 in the triangular lattice form), which are densely arranged with the fuel rods 6, and the regions (i.e., the regions arranged with the fuel rods 6 in the square lattice form), which are coarsely arranged with the fuel rods 6, are formed in the fuel assembly 5.

The average concentration in the transverse section of the fuel assembly 5 is about 4.7 wt. %. This average enrichment is uniform all over the whole length of the axial direction of the effective fuel length portion of the fuel assembly 5.

Figure 6:
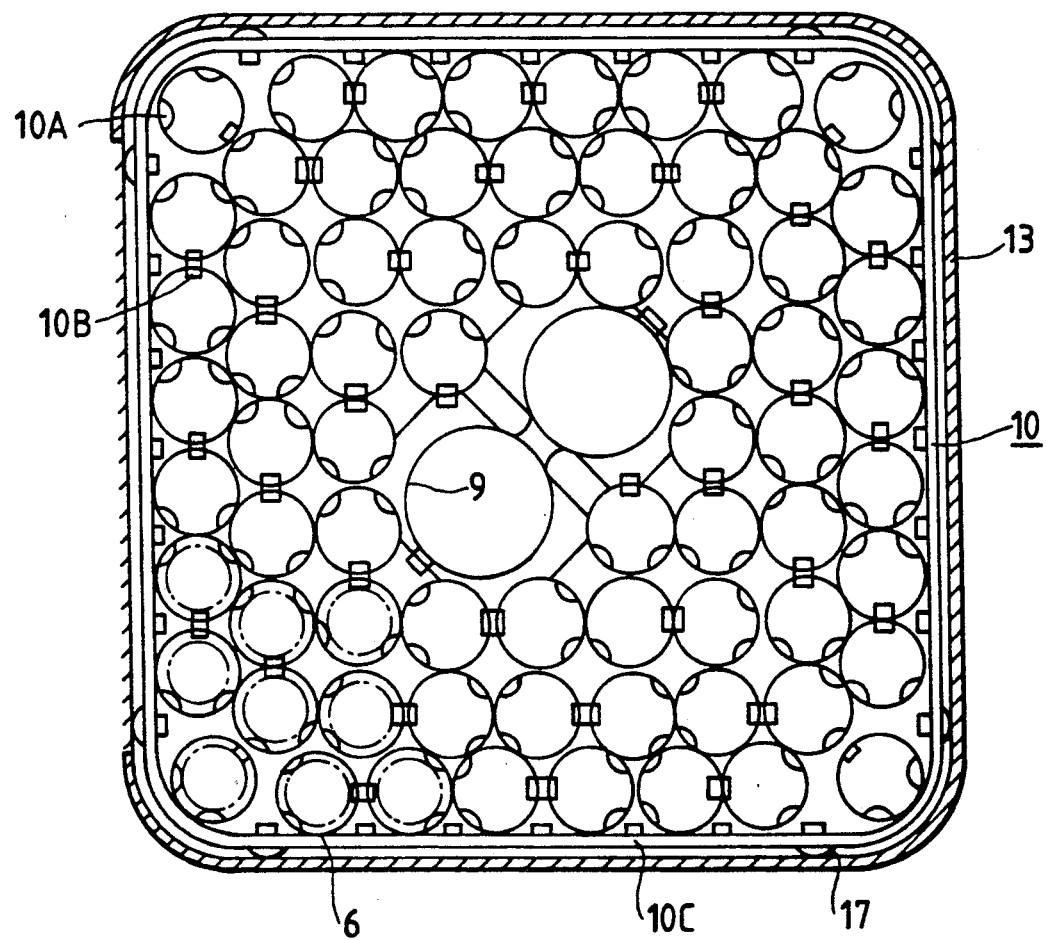
FIG. 6 is a section taken along line VI—VI of FIG. 4.
Figure 7:
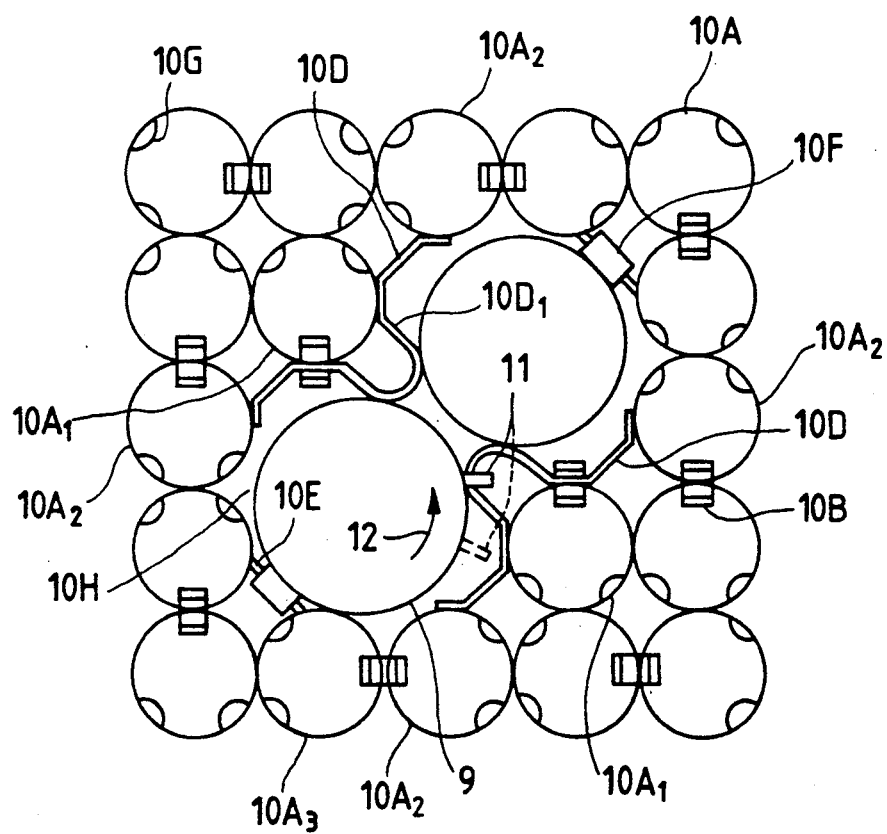
FIG. 7 is an enlarged view of the central portion of the fuel spacer of FIG. 6.

FIGS. 6 and 7 show a detail structure of the fuel spacer 10. The fuel spacer 10 is equipped, like the fuel spacer shown in FIGS. 2A of U.S. Pat. No. 4,508,679 (which corresponds to Japanese Patent Laid-Open No. 65287/1984), with seventy cylindrical sleeves 10A for receiving the fuel rods 6, loop springs 10B, a band 10C, plates 10E and springs 10F. The fuel spacer 10 is of a round cell type having a plurality of cylindrical sleeves, i.e., round cells. The cylindrical sleeves 10A have two projections 10G projecting inward. The cylindrical sleeves 10A are welded to each other. The band 10C is attached to the outer sides of the twenty eight cylindrical sleeves 10A arrayed at the outermost periphery. The band 10C is equipped with bath tubs 17 in the vicinity of the corners. These bath tube 17 are in contact with the inner face of the channel box 13 to restrain the transverse movement of the fuel spacer 10. The loop springs 10B are attached to the two adjacent cylindrical sleeves 10A. The fuel rods 6 inserted in the cylindrical sleeves 10A are held at the three points, i.e., the two projections 10G and the one loop springs 10B.

In the central region, the cylindrical sleeves 10A are arranged in the form of a square lattice like the fuel rods 6. In the peripheral region surrounding the central region, the cylindrical sleeves 10A are arranged in the form of a triangular lattice. As a result, the cylindrical sleeves 10A positioned in the peripheral region are partially fitted between the cylindrical sleeves 10A positioned in the outermost periphery of the central region. The internal and external diameters of all the cylindrical sleeves 10A are equal. Most of the cylindrical sleeves 10A are arranged at the pitch $P_2$ ($=P_1$) like the fuel rods 6.

In the fuel spacer 10, the cylindrical sleeves 10A on one diagonal line are arranged from the outermost periphery to the third column whereas the cylindrical sleeves 10A on the other diagonal line are arranged from the outermost periphery to the fourth column. The two water rods 9 are inserted into an inner region (i.e., the water rod receiving region) 10H which is surrounded by two cylindrical sleeves $10A_1$ arranged from the outermost periphery to the fourth column and eight cylindrical sleeves 10A arranged from the outermost periphery to the third column. The plates 10D are attached to the side faces of the cylindrical sleeves $10A_1$ and the side faces of cylindrical sleeves $10A_2$, which are adjacent to the two sides of the cylindrical sleeves 10A₁, those side faces being positioned to face the region 10H. Each plate 10D has its U-shaped portion 10D₁ projecting into the region 10H. Each plate 10E is attached to the side faces of two cylindrical sleeves 10A₃ facing the water rod receiving region 10H. The springs 10F are mounted on the plates 10E. The two adjacent water rods 10F are held at three points, i.e., the springs 10F and the U-shaped portions 10D₁ of the two plates 10D. The fuel spacer 10 can be easily restrained from moving transversely of the two larger-diameter water rods 9. One U-shaped portion 10D₁ is supported by a projection 11 formed on one water rod 9 so that the fuel spacer 10 is easily supported by the water rod 9. In other words, the fuel spacer 10 is mounted on the water rod 9 with the projection 11 being in the position indicated by broken lines in FIG. 7. After this, the projection 11 is moved to the position of the U-shaped portion 10D₁ by turning the water rod 9 in the direction of arrow 12. Thus, the fuel spacer 10 is supported by the water rod 9.

The operations and effects of the fuel assembly used in the present embodiment thus constructed will be described in the following.

Figure 8:
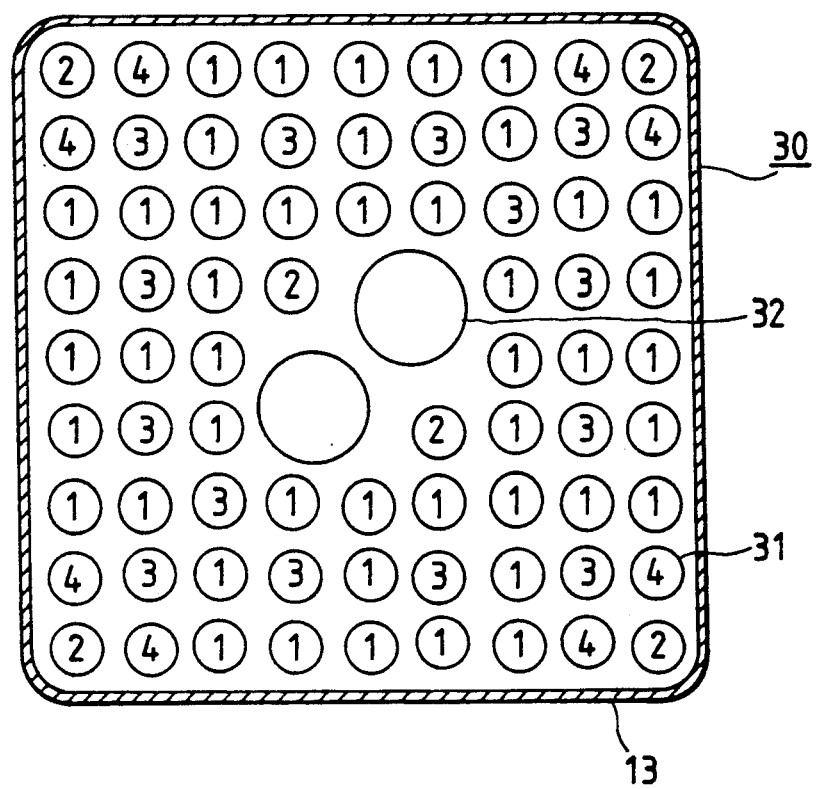
FIG. 8 is a transverse section showing the fuel assembly (although not laid open yet) disclosed in the preceding application of the present invention.
Figure 9:
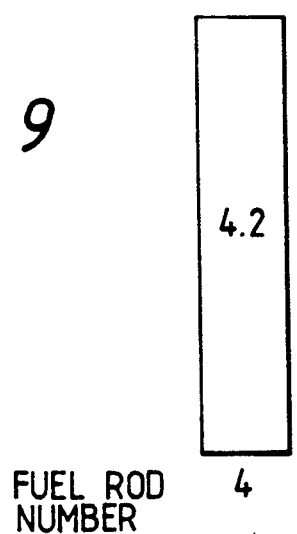
FIG. 9 is an explanatory view showing the enrichment distribution of the fuel rod 4 of FIG. 6.

In order to aid in understanding the operations and effects of the present embodiment, the summary of the fuel assembly of the invention, which is shown in FIG. 1 of Japanese Patent Application No. 147061/1987 (filed on Jun. 15, 1987 and bearing Laid-Open No. 311195/1988 (laid open on Dec. 9, 1988) prior to the present invention, will be described with reference to FIG. 8. This fuel assembly is constructed like the fuel assembly 5 by arranging two water rods 32 of large diameter in the central portion and adjacent to each other and by surrounding the water rods 32 by fuel rods 31 arranged in the form of a tetragonal lattice. These fuel rods 31 to be used are exemplified by not only the aforementioned fuel rods 1 to 3 but also the fuel rods 4 shown in FIG. 9. The arrangement of the fuel rods 1 to 3 is substantially similar to that of the fuel assembly 5. The fuel rods 4 are arranged in the outermost periphery and adjacent to the fuel rods 2. The average enrichment of the fuel assembly 30 in the transverse section is uniform at about 4.6 wt. % all over the whole length in the axial direction of the effective fuel length portion. The fuel rods 31 has an external diameter of about 10.6 mm.

The embodiment of FIG. 1 can suppress the local power peaking and increase the minimum critical power ratio. These functions are obtained by using the fuel assembly 5 in which the fuel rods arranged in the outermost periphery of the fuel assembly 30 are arranged in the triangular lattice form.

The fuel assembly 30 has its local power peaking reduced to flatten the power distribution in the transverse section. However, the fuel assembly 30 has its power distribution maximized in the vicinity of the outermost periphery by the influences of the water gap formed therearound in the core. Since the fuel assembly 5 has its fuel rods 6 arranged in the triangular lattice form in the peripheral region, the ratio of the moderator to the fuel (i.e., the ratio of the number of hydrogen atoms to the number of uranium atoms) in the vicinity of the peripheral region can be reduced to the influences of the neutron slowing-down effect in the water gap. As a result, the power distribution in the peripheral region of the fuel assembly 5 is relatively dropped so that the local power peaking of the fuel assembly can be suppressed.

In the fuel assembly 5, the pitches of the fuel rods 6 can be substantially equalized. As a result, the fuel assembly 5 has no portion, in which the pitches of the fuel rods are locally small as in the structure of FIG. 3 of Japanese Patent Laid-Open No. 202386/1985, so that it can have a high MCPR. The transition from the nucleate boiling to the film boiling is liable to take place in the fuel rods in the peripheral portion where the power distribution is high. The structure of FIG. 3 of the Japanese Patent Laid-Open No. 202386/1985 has a remarkably severe MCPR because the pitch of the fuel rods is smaller in the peripheral portion of large power distribution. The fuel rod assembly 5 can have its MCPR improved to a level similar to that of the fuel assembly 30 because the pitch of the fuel rods 6 in the peripheral region is large.

The reduction in the local output peaking will give the fuel assembly 5 the following effects. Specifically, the degree of burn-up of the fuel assembly 5 can be augmented to a level higher than that of the fuel assembly even if its average enrichment is substantially equal to that of the fuel assembly 30. In other words, the augmentation of enrichment can be achieved by suppressing the increase in the maximum enrichment (i.e., the enrichment of the fuel rods 1) in the fuel assembly 5. Specifically, the enrichment can be increased about 1% by arranging the fuel rods 6 of the peripheral region in the triangular lattice form as in the fuel assembly 5. In case a similar increase in the discharged exposure is to be achieved by increasing the average enrichment of the fuel assembly 30, the maximum enrichment of the fuel assembly 30 exceeds 5 wt. % considerably. This makes it necessary to elongate the uranium enriching time and enlarge the size (or increase the number of cascade steps) of the uranium enriching facilities. These problem will not arise from the fuel assembly.

Figure 10A:
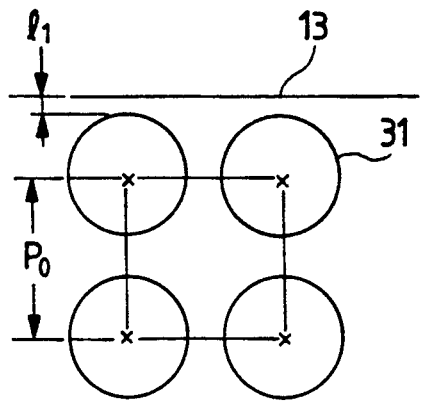
FIGS. 10A and 10B are explanatory diagrams showing the distances between the fuel rod at the outermost periphery and the inner face of the channel box.
Figure 10B:
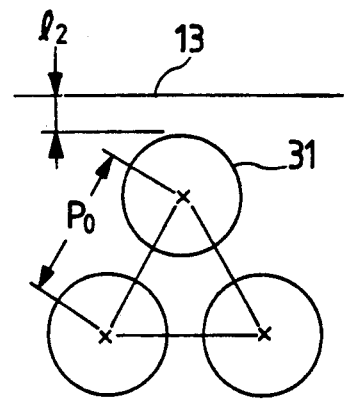

Moreover, the fuel assembly 5 can have the same fuel inventory to that of the fuel assembly although it has fuel rods less by four. The reason for this will be described in the following. In the fuel assembly 30, as shown in FIG. 10A, the fuel rods 31 are arranged at a pitch P₀ in the form of a tetragonal lattice. The distance between the axis of the fuel rod 31 arranged in the outermost periphery and the inner face of the channel box 13 is designated at l₁. In case the fuel rods 31 in the outermost periphery of the fuel assembly 30 are arranged in the form of a triangular lattice, as shown in FIG. 10B, the distance between the fuel rod 31 and the inner face of the channel box 13 is designated at l₂. The distance l₂ is larger than the distance l₁, as will be understood from the following equation (1):

$$l_2 - l_1 = (2 - \sqrt{3}) P_0/2. \tag{1}$$

The increment of the distance l₁, which is caused by arraying the fuel rods 31 of the fuel rods 31 in the triangular lattice form in the fuel assembly 30, can be utilized to enlarge the pitch P₀ (i.e., the pitch P₀–P₂). The increment of the pitch can also be utilized to increase the external diameter of the fuel rods 31. In the fuel assembly 5 and the fuel assembly 30, the distances between the inner faces of the channel boxes 13 are equal. As a result, the pitch P₂ of the fuel rods 6 of the fuel assembly 5 can be increased to a value 1.03 times as large as the pitch P₀ of the fuel rods 31 of the fuel assembly 30. The external diameter of the fuel rods 6 is also 1.03 times as large as that of the fuel rods 31. Accordingly, the diameter of the fuel pellets of the fuel rods 6 can be enlarged. The fuel assembly 5 has fuel rods less by four than those of the fuel assembly 30. Since, however, the cross-sectional area of the fuel pellets in the fuel rods 6 can be made larger by 6% than that in the fuel rods 31, the reduction in fuel inventory following the reduction of the four fuel rods 31 can be sufficiently compensated.

Moreover, the external diameter of each water rod 9 can be made 1.03 times as large as that of the water rod 32 by making the pitch $P_2$ 1.03 times as large as the pitch $P_0$. As a result, the flow area of the cooling water in the water rod 9 is enlarged by 1.06 times to increase the ratio of the moderator to the fuel in the central region so that the local power peaking can be made lower. This averages the ratio of burn-up of the fuel substance in each fuel rod 6. As a result, the increment of the degree of burn-up due to the increment of the flow area of the cooling water of the water rod can be added to the increment (of about 1%) of discharged exposure resulting from the triangular lattice arrangement of the fuel rods 6.

In order that fuel inventory may be equal to or higher than that of the fuel assembly 30 with the fuel rods in the peripheral region being arranged in the triangular lattice form, as has been described hereinbefore, the shortest distance $_2$ between the axis of the fuel rods 6 arranged in the outermost periphery and the inner face of the channel box 13 is desired to be not more than the summation of the distance t between the inner face of the band 10C and the face of the bath tubs 17 contacting with the channel box 13 and the value $P_2/2$. The distance t in the fuel assembly 30 is 2.6 times as large as the thickness $t_1$ of the band 10C. Therefore, the desired value of the shortest distance $_2$ should not exceed the value of $(2.6t_1 + P_2/2)$. In the fuel assembly 5, $_2 = 2.6t_1 + P_2/2$.

The fuel assembly 5 can also achieve the effects obtained from the fuel assembly 30. This is because the average enrichment of the fuel rods 2 adjacent to the two water rods 9 is lower than that of the other fuel rods (i.e., the fuel rods 1) adjacent to the former fuel rods 2. The functions to be obtained from this structure will be described in the following.

Figure 11:
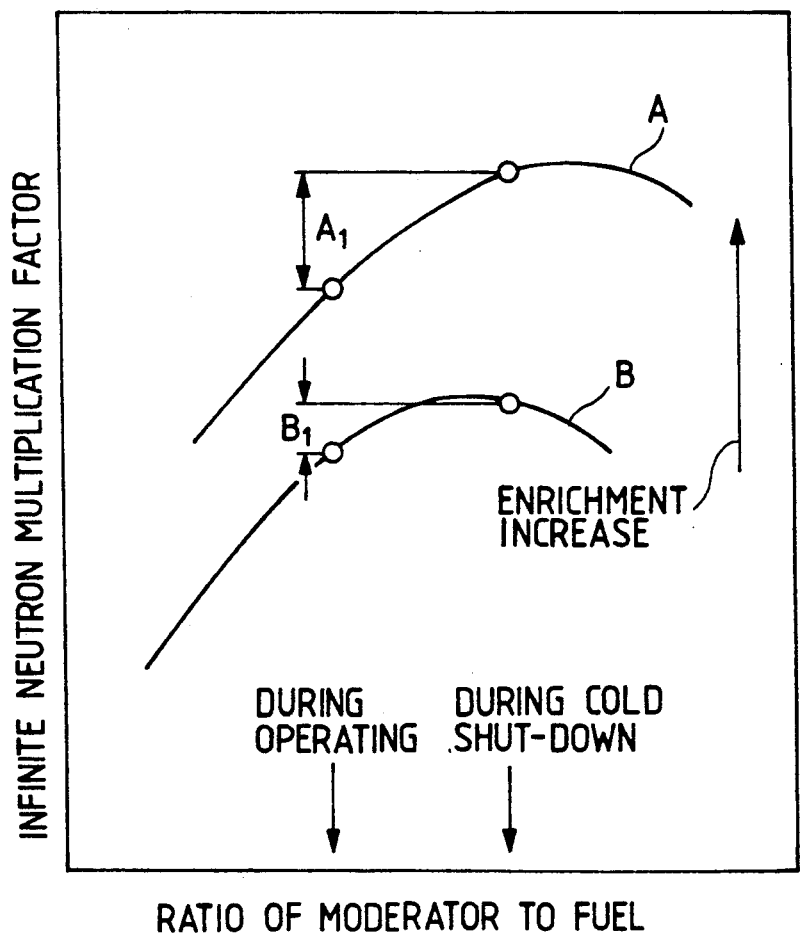
FIG. 11 is a characteristic diagram showing the relations between the moderator/fuel ratio and the infinite multiplication factor.

FIG. 11 plots the infinite multiplication factor against the ratio of the moderator to the fuel due to the increase in the average enrichment of the fuel assembly in the boiling water reactor. A characteristic curve A corresponds to the fuel assembly of high discharged exposure having a high average enrichment, and a characteristic curve B corresponds to the fuel assembly (of the prior art) having a low average enrichment. Characters $A_1$ designate the difference between the infinite multiplication factor of the fuel assembly of the characteristic curve A having a high average enrichment during reactor operation and during the cold shut-down of the reactor. On the other hand, characters $B_1$ designate the difference between the infinite multiplication factor of the fuel assembly of the characteristic curve B having a low average enrichment during the reactor operation and during the cold shut-down of the reactor. For the characteristic curves A and B, the infinite multiplication factor is small during reactor operation having many voids and is large during the cold shut-down of the reactor in which the voids are less so that the neutrons may be well moderated. Here, as the average enrichment of the fuel assembly is the higher, the difference in the infinite multiplication factor between the power run and the cold reactor shut-down of the reactor. This implies that the reactor shut-down allowance is the lower for the fuel assembly of the higher average enrichment.

Figure 12:
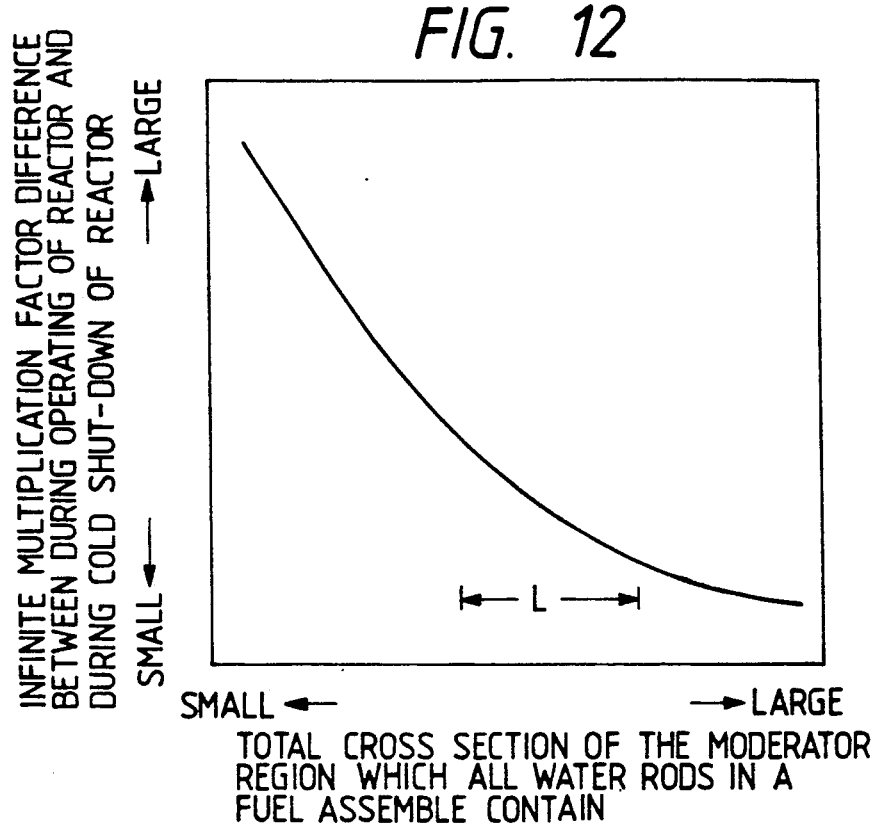
FIG. 12 is a characteristic diagram showing the change in the difference of the infinite multiplication factor between the power run and the cold shut-down against the total cross-sectional area of the moderator region of the total water rods in the fuel assembly.

By augmenting the cross-sectional area of the moderator region of the water rods in the fuel assembly, however, the difference in the infinite multiplication factor between the power run and the cold shut-down of the reactor is reduced (as shown in FIG. 12) to augment the reactor shut-down allowance. This is caused by the fact that the cooling water flowing up in the water rods has a very small probability of boiling in the upper portions of the water rods and is in the saturated state. Moreover, the increase in the cross-sectional area of the moderator region of the water rods improves the ratio of the moderator to the fuel so that it highly contributes to the flattening of the thermal neutron flux distribution (or power distribution) in the transverse section of the fuel assembly.

Figure 13:
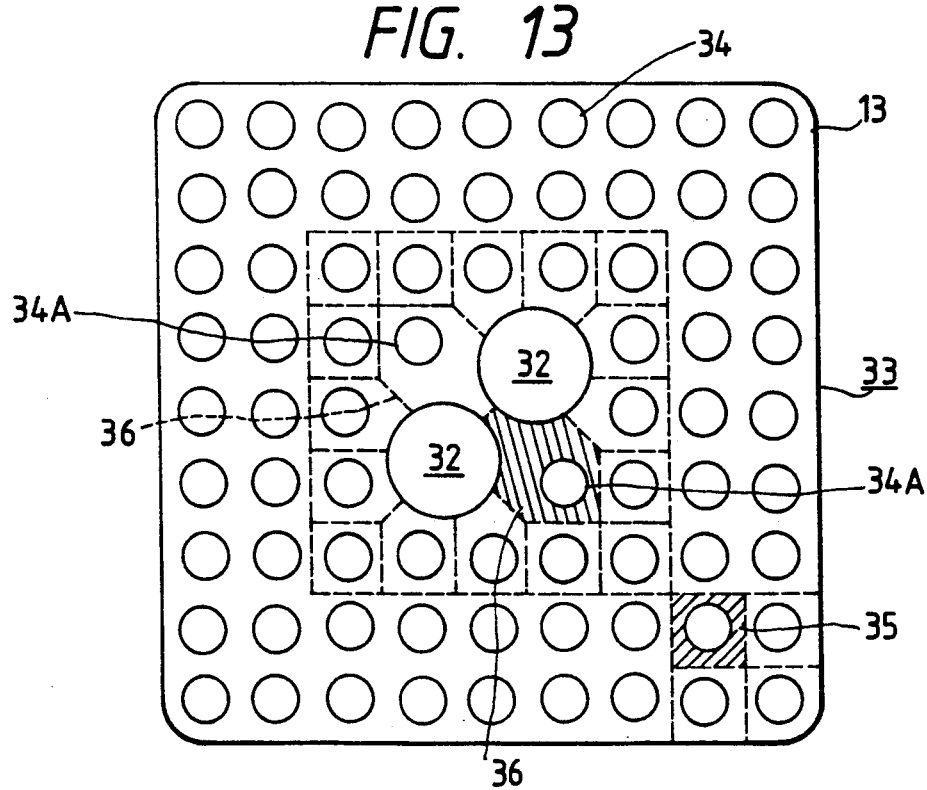
FIG. 13 is an explanatory diagram showing the coolant region formed around the individual fuel rods in the fuel assembly, as disclosed in Japanese Patent Laid-Open No. 217186/1987.

The fuel assembly 5 is arranged at its central portion with two water rods 9 of larger diameter like that shown in FIG. 7 of Japanese Patent Laid-Open No. 217186/1987. The fuel assembly thus having the two larger-diameter water rods 9 has the larger coolant region which is formed adjacent to the water rods 9 and around the fuel rods. This raises one case for dropping the reactor shut-down allowance. This content will be described with reference to FIG. 12 in connection with the example of the fuel assembly of FIG. 7 of the Japanese Patent Laid-Open No. 217186/1987. The area (excepting that in two water rods 32) of the coolant region in the channel box 13 of a fuel assembly 33 is divided in connection with seventy four fuel rods 34, as shown in FIG. 13. Although not partially written in, broken lines indicate the boundaries of the coolant regions for the individual fuel rods 34. These broken lines are phantom lines extending between the adjacent fuel rods 34. Most of these fuel rods 34 have coolant regions therearound, as designated at 35. However, two fuel rods 34A, which are arranged on one diagonal line of the fuel assembly 33 perpendicular to a straight line joining the axes of the two water rods 32 and connected to the individual water rods 32, are surrounded by coolant regions 36 having a far larger area than that of the coolant regions 35. The density of the coolant in the coolant region is changed between the power run and the cold shut-down of the reactor because the vacuum voids appear in the power run of the reactor but disappear in the cold shut-down of the reactor. This changing ratio is remarkably higher in the coolant region 36 adjacent to the two water rods 32 than in the coolant region 35. In order to solve this problem, the fuel assembly 5 drops the reactivity of the fuel rods which are arranged in the individual coolant regions 36 adjacent to the two water rods 9. Specifically, the average enrichment of the two fuel rods 2 adjacent to the water rods 9 is lower than that of the fuel rods 1 adjacent to those fuel rods 2.

The increase in the reactor shut-down allowance to be caused in case the fuel rods 2 are adjacent to the water rods 9 will be quantitatively described with reference to FIG. 14. In FIG. 14, a broken curve indicates the changing behavior of the difference in the infinite multiplication factor between the power run and the cold shut-down of the reactor in dependence upon the degree of burn-up in case the enrichment of the fuel rods 2 adjacent to the water rods 9 in the fuel assembly 5 is 4.9 wt. % (all over the axial length of the effective fuel length portion). A solid curve indicates the changing behavior of the difference in the aforementioned infinite multiplication factor in dependence upon the degree of burn-up in case the enrichment of the effective fuel length portion of the fuel rods 2 adjacent to the water rods 9 in the fuel assembly 5 is 3.2 wt. %. As is apparent from FIG. 14, the difference in the infinite multiplication factor between the power run and the cold shut-down of the reactor is small in case the enrichment of the fuel rods 2 (i.e., the fuel rods arranged in the coolant region 36) adjacent to the two water rods 9 is lower than that of the other fuel rods adjacent to the fuel rods 2. This phenomenon augments the reactor shut-down allowance.

Figure 15A:
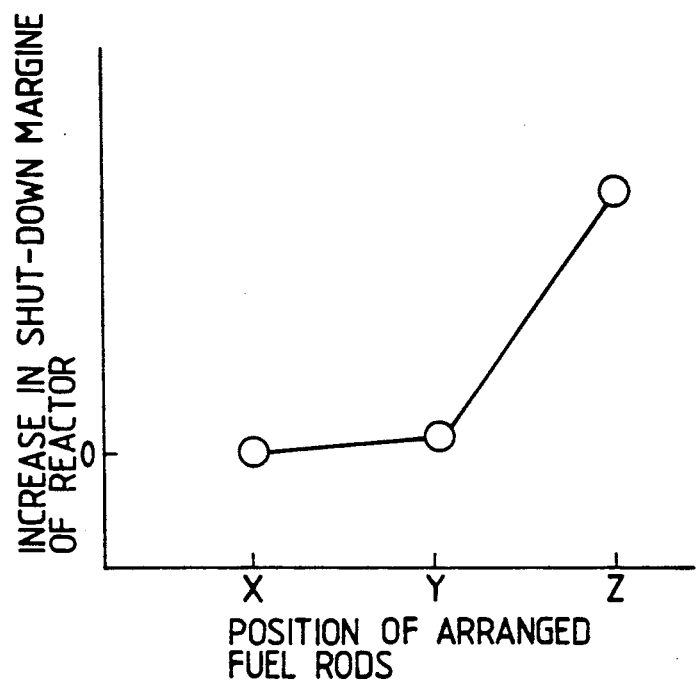
FIG. 15A is a characteristic diagram showing the change in the reactor shut-down allowance against the difference of the arrangement positions of the slightly enriched fuel rods.
Figure 15B:
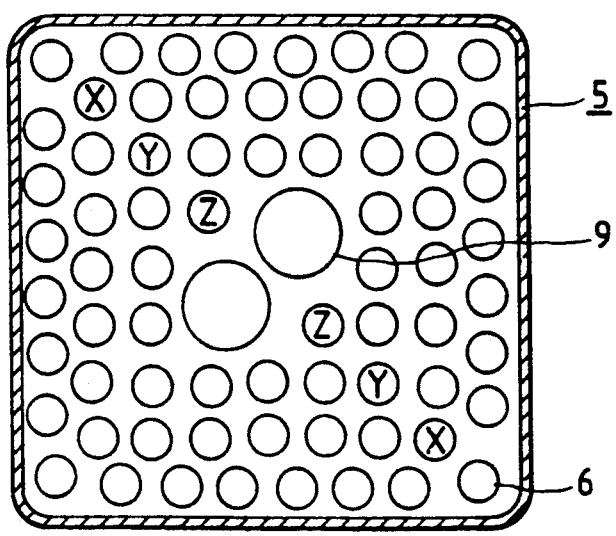
FIG. 15B is an explanatory diagram showing the arrangement positions of the slightly enriched fuel rods and corresponds to the characteristics of FIG. 15A.

FIG. 15 plots the change in the reactor shut-down allowance in case the positions of the two fuel rods 2 having an enrichment of 3.2 wt. % are changed on one diagonal line perpendicular to the straight line joining the axes of the two water rods 9. The reactor shut-down allowance is remarkably increased by arranging the fuel rods 2 in positions Z (in the coolant region 36) adjacent to the two water rods 9 than in positions X and Y, as shown in FIG. 15A. The positions X, Y and Z are located in FIG. 15B.

Figure 16:
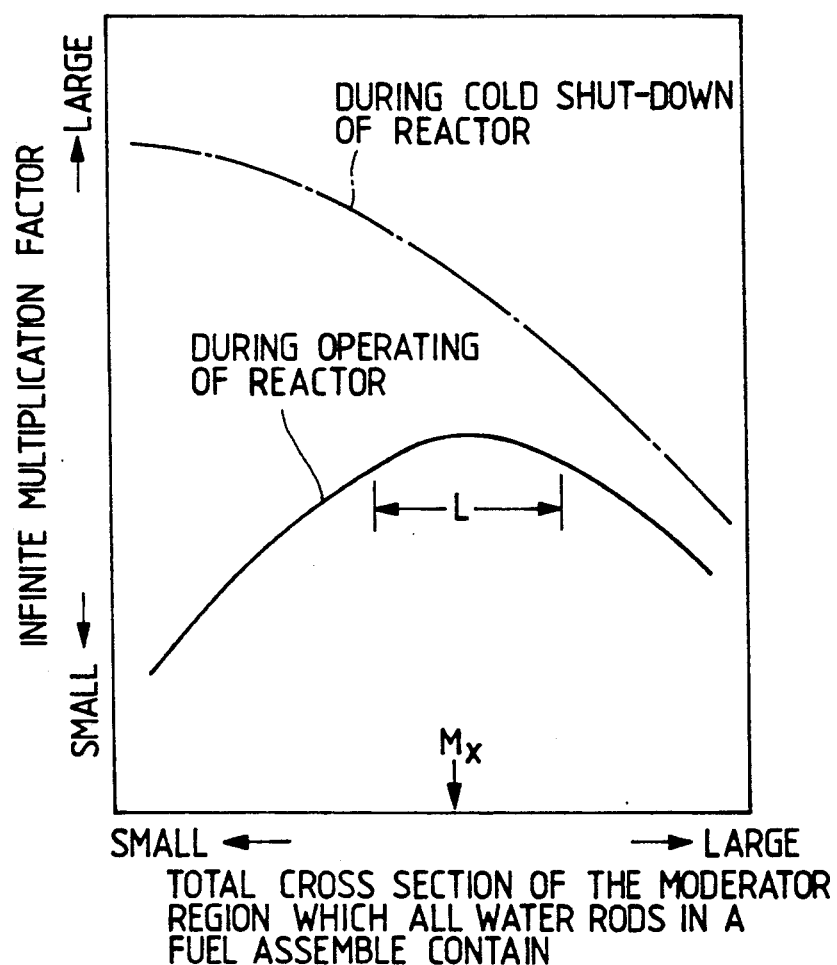
FIG. 16 is a characteristic diagram showing the relations between the total cross-sectional area of the moderator region of the total water rods in the fuel assembly and the infinite multiplication factor.

The fuel assembly 5 can attain the increase in the reactor shut-down allowance by the two different functions, as shown in FIG. 16. One function is to increase the reactor shut-down allowance by increasing the total cross-sectional area of the moderator region of the water rods 9. Another is to increase the reactor shut-down allowance by arranging the fuel rods 2 in the coolant region 36 (having an area about two times as large as that of the coolant region 35) adjacent to the two larger-diameter water rods 9.

The characteristics shown in FIG. 16 are obtained by changing the cross-sectional area of the water rods 9 of the fuel assembly 5 shown in FIG. 2. The fuel economy to be obtained by the contribution of the size of the water rods is maximized by using the area (nine times as large as the cross-sectional area of the fuel rods 6) of point Mx as the total cross-sectional area of the moderator area of the water rods 9 in the fuel assembly 5. In order to obtain a desired fuel economy in the fuel assembly having the two larger-diameter water rods diagonally and adjacent to each other, it is preferable to satisfy the following conditions. Specifically, the total cross-sectional area of the slowing-down region of the water rods in the fuel assembly is preferably set within a range (i.e., the range L of FIG. 16) of seven to twelve times as large as that of one fuel rod. As has been described hereinbefore, the increase in the cross-sectional area of the water rods in the fuel assembly has functions to reduce the reactor shut-down allowance and to flatten the power distribution. In case, however, the cross-sectional area of the water rods becomes excessively large, bad influences are intensified following the reduction in the fuel inventory containing a fissile material (e.g., uranium 235) and a fertile material (e.g., uranium 238). It is therefore desired that the total cross-sectional area of the slowing-down region of the two water rods 9 in the fuel assembly 5 be not over twelve times as large as the cross-sectional area of one fuel rod 6.

In the fuel assembly 5, the fuel rods 2 are inserted into the cylindrical sleeves 10A₁ which are arranged on one diagonal line of a region capable of being arranged with the two water rods 9, i.e., a region capable of being arranged with the fuel rods 6 in three rows and three columns. In the present embodiment, therefore, only the seven fuel rods are eliminated, as described herein-before, for the two larger-diameter water rods 9 so that as many as seventy fuel rods 6 can be arranged. As a result, the charge of the nuclear fuel inventory is increased. This point enhances the fuel economy of the fuel assembly 5.

Since the fuel assembly 5 uses a round cell type fuel spacer having a plurality of cylindrical sleeves 10A, the MCPR is the higher than that of the case using a lattice type fuel spacer composed in combination of lattice plates intersecting at a right angle in the X and Y directions. This is caused by the fact that the spacings between the fuel rods 6 and the cylindrical sleeves 10A of the round cell type fuel spacer are equal around the fuel rods 6. In other words, the turbulences of the cooling water flowing between the fuel rods 6 and the cylindrical sleeves 10A are reduced. This reduction of the turbulences of the cooling water flow reduces the separation of the liquid films to be formed on the surfaces of the fuel rods 6. As a result, the cooling effect of the fuel rods 6 is improved to increase the MCPR of the round cell type fuel spacer. Since, moreover, the lattice type fuel spacer has cells having substantially square cross-sectional areas for receiving the fuel rods, the widths of the cooling water passages around the fuel rods in the square cells are changed. In the lattice type fuel spacer, therefore, turbulences of the cooling water flow such as vortexes are enlarged around the fuel rods, i.e., at the individual corners of the cooling water passages in the square cells so that the liquid films are more liable to be separated from the surfaces of the fuel rods than the round cell type fuel spacer.

Moreover, the water rods 9 can be easily manufactured because they have round transverse sections. Since the fuel spacer is equipped with the plates having the U-shaped portions, the fuel spacer can be easily held by the water rods 9. Since the cylindrical sleeves 10A are arranged in the forms of square and triangular lattices, as has been described hereinbefore, the fuel rods 6 are remarkably easily arranged in the square and triangular lattice forms. Since, moreover, the round cell type fuel space may be constructed by welding the cylindrical sleeves to one another, it can be easily manufactured to a structure in which the above-specified fuel rod arrangement can be made. Since more fuel rods 22 are arranged in nine rows and nine columns, the total surface area of all the fuel rods can be increased to enhance the flux power density. Such fuel assembly 5 can achieve a high discharged exposure of about 55 GWd/T or more.

Figure 3:
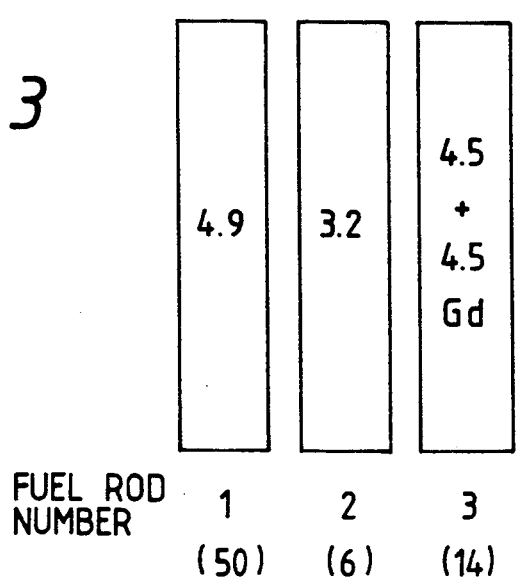
FIG. 3 is an explanatory diagram showing the enrichment distributions of fuel rods 1 to 3.
Figure 4:
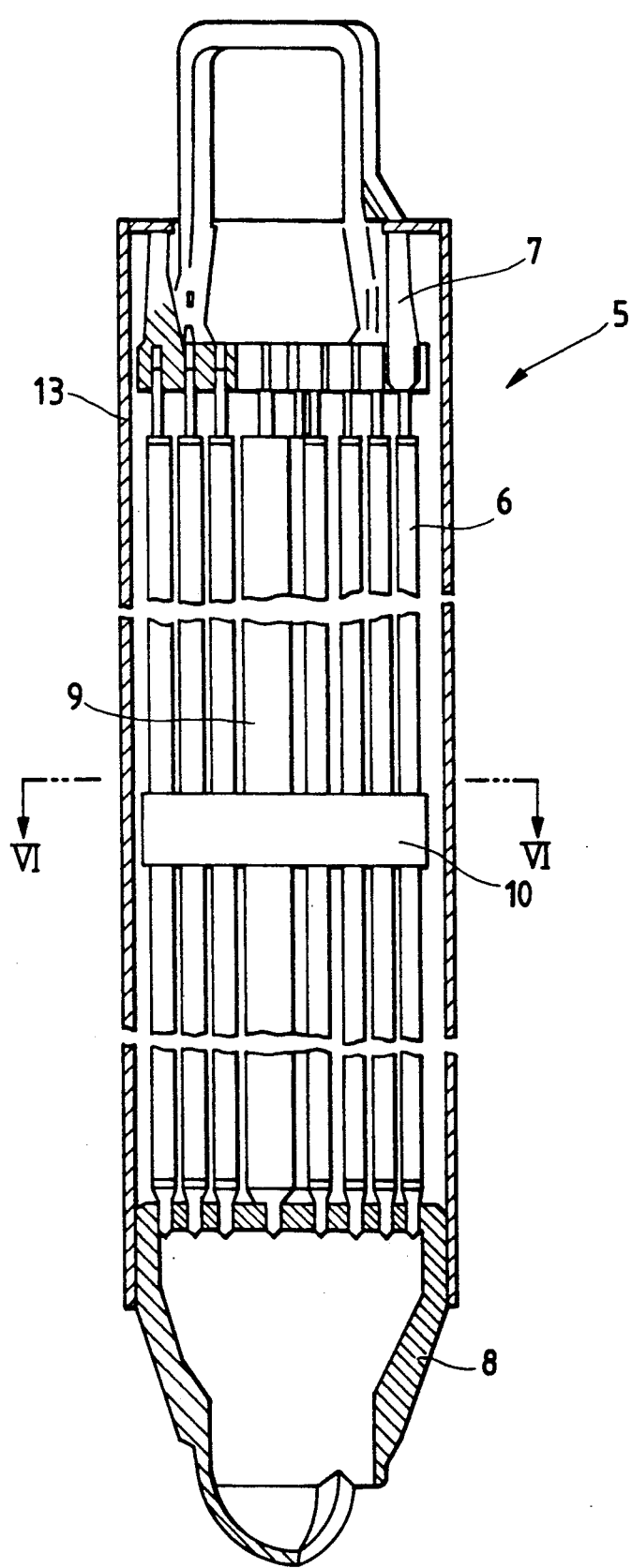
FIG. 4 is a longitudinal section showing the fuel assembly of FIG. 2.

The technical concept applied to the fuel assembly 5, in which the fuel rods are arranged in the square lattice form in the central region and in the triangular lattice form in the peripheral portion, can also be applied to the fuel assembly shown in FIGS. 3 to 5 of Japanese Patent Laid-Open No. 217186/1987 and further to a fuel assembly having no water rod, for example.

Even in case the enrichment of the fuel rods 2 adjacent to the water rods 9 in the fuel assembly 5 is made equal to that of the fuel rods 1 adjacent thereto, a predetermined concentration of gadlinium may be added to the range of the effective fuel length portions of the fuel rods. As a result of the gadlinium thus added, the infinite multiplication factor of the fuel rods 2 can be made lower than that of the adjacent fuel rods 1 (even at exposure of zero). The gadlinium concentration is so adjusted as to be bured out in one fuel cycle. It is desirably accomplished by the adjustment of the enrichment to make the infinite multiplication factor of at least upper end portions of the fuel rods adjacent to the two water rods 9 lower than that of the corresponding regions of the fuel rods adjacent to the former fuel rods. In the case of the adjustment of the enrichment, the difference in the infinite multiplication factor between the fuel rods 2 adjacent to the two water rods 9 and the fuel rods 1 adjacent to the former fuel rods 2 is substantially unchanged even with an augmentation of exposure. In case the aforementioned difference in the infinite multiplication factor is made by adding a burnable poison, that difference in the infinite multiplication factor is changed with the augmentation of exposure.

In case the infinite multiplication factor is adjusted by the burnable poison, the function to increase the reactor shut-down allowance depending upon the small infinite multiplication factor of the fuel rods arranged in the coolant region 36 is not maintained for the lifetime period of the fuel assembly but disappears within a short time.

Figure 17:
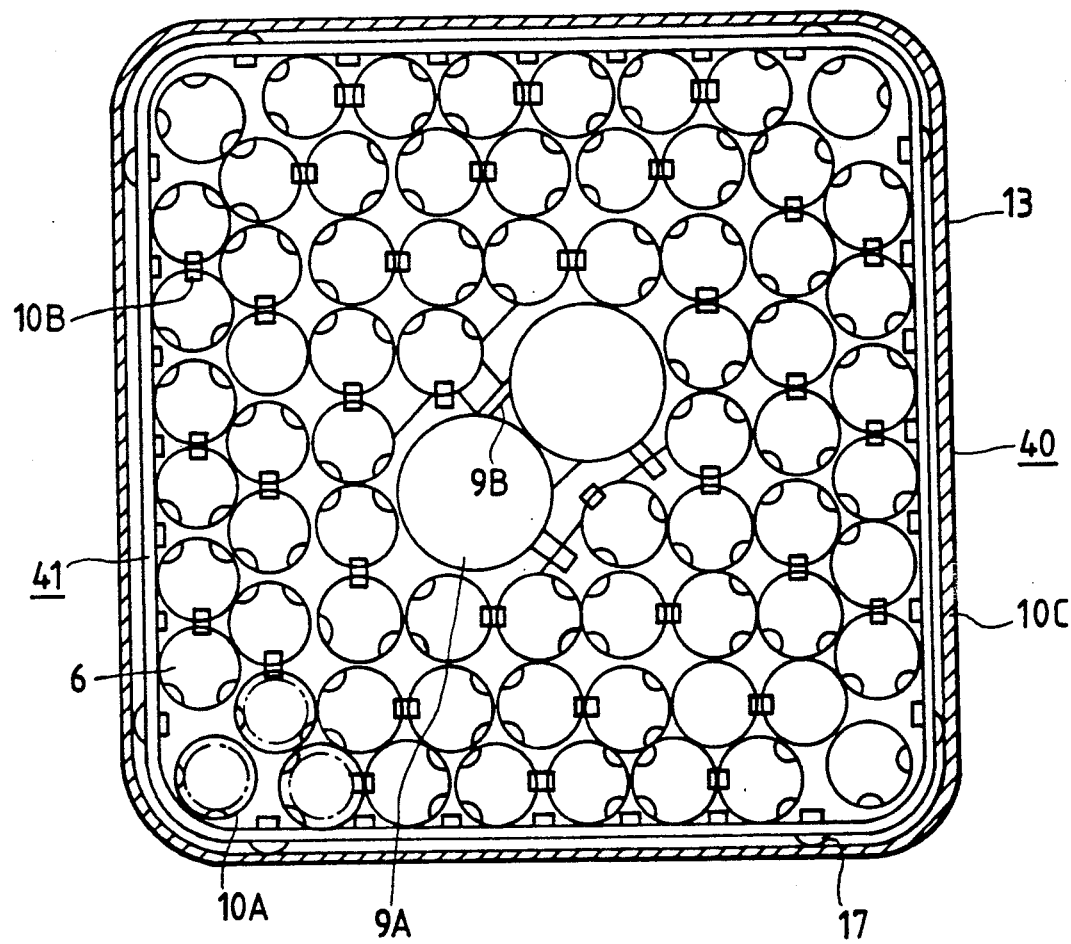
FIGS. 17 and 19 are transverse sections showing other embodiments of the fuel assembly.
Figure 18:
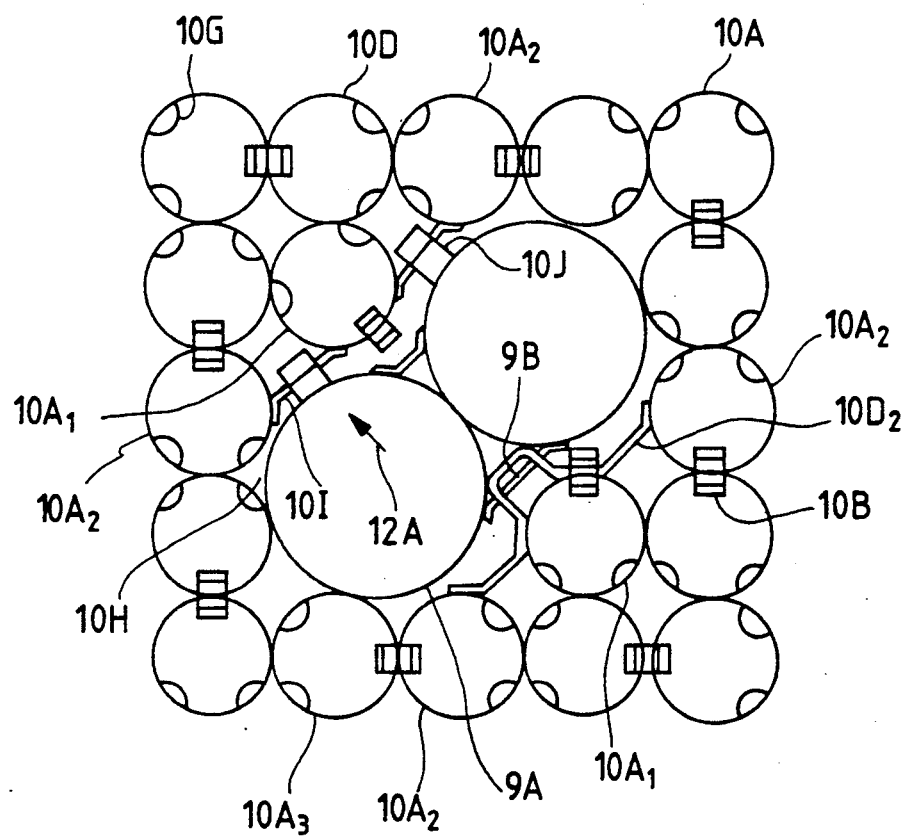
FIG. 18 is an enlarged diagram showing the central portion of the fuel spacer of FIG. 17.

Another embodiment of the fuel assembly to be applied to the core of the reactor shown in FIG. 1 will be described with reference to FIGS. 17 and 18. A fuel assembly 40 of the present embodiment is modified such that the external diameter of the water rods 9 of the fuel assembly 5 is so enlarged as to effect contact with the water rods 9. Specifically, two water rods 9A arranged in the central region of the fuel assembly 40 have a larger external diameter than that of the water rods 9. These two water rods 9A are connected by a pair of binding members 9B which are attached in parallel to the side faces. The two water rods 9A thus connected are prevented from vibrations which might otherwise be caused by the flowing vibrations of the cooling water. This makes it possible to prevent the occurrence of the fretting corrosion in the water rods 9A. A fuel spacer 41 is equipped with the cylindrical sleeves 10A which are likewise arranged as in the fuel spacer 10. The fuel spacer 41 is different from the fuel spacer 10 in the structure of the central portion in connection with the water rods 9A connected to each other. The fuel spacer 41 is composed of: one plate $10D_2$ attached to both one cylindrical sleeve $10A_1$ facing the region 10H and tow cylindrical sleeves $10A_2$ adjacent to the two sides of the cylindrical sleeve $10A_1$; and a pair of plates 10I attached to both another cylindrical sleeve $10A_1$ and the cylindrical sleeves $10A_2$ adjacent to the cylindrical sleeve $10A_1$. The plate $10D_2$ has a U-shaped portion contacting with the two water rods 9A. A spring 10J is mounted on each of the plates 10I. The fuel spacer 41 is supported by fitting the plate $10D_2$ between the binding members 9B arranged in the axial direction. The paired springs 10J urge the two water rods 9A to the plate $10D_2$. These springs 10J prevent the U-shaped portion of the plate $10D_2$ from coming out from the binding members 9B. The paired binding members 9B are at a predetermined vertical spacing to the outer faces of the two water rods 9A facing the plate $10D_2$. The U-shaped portion of the plate $10D_2$ is fitted between the binding members 9B so that it is kept away from dropping by the lower binding member 9B. The two water rods 9A thus connected by the binding members 9B are inserted into the region 10H with the springs 10J being compressed in the direction of arrow 12A. When the U-shaped portion of the plate $10D_2$ reaches a predetermined position in the axial direction, the force having pushed the water rods 9A in the direction of the arrow 12A is released to insert the U-shaped portion between the binding members 9B, as described above.

The remaining structure of the fuel assembly 40 is identical to that of the fuel assembly 5. In the fuel assembly 40, the total cross-sectional area of the slowing-down region of the two water rods 9A is about ten times as large as the cross-sectional area of one fuel rod 6. As a result, the fuel assembly 40 has its cross-sectional power distribution more flattened than the fuel assembly so that it can augment the degree of burn-up more than the fuel assembly 5. In the fuel assembly 40, moreover, the fuel spacer 41 can be easily held by the bound water rods 9A. The fuel assembly 40 can attain the effects similar to those of the fuel assembly 5. The force of FIG. 1 loaded with the fuel assembly 40 can attain the same effects as those of the core loaded with the fuel assembly 5.

Figure 19:
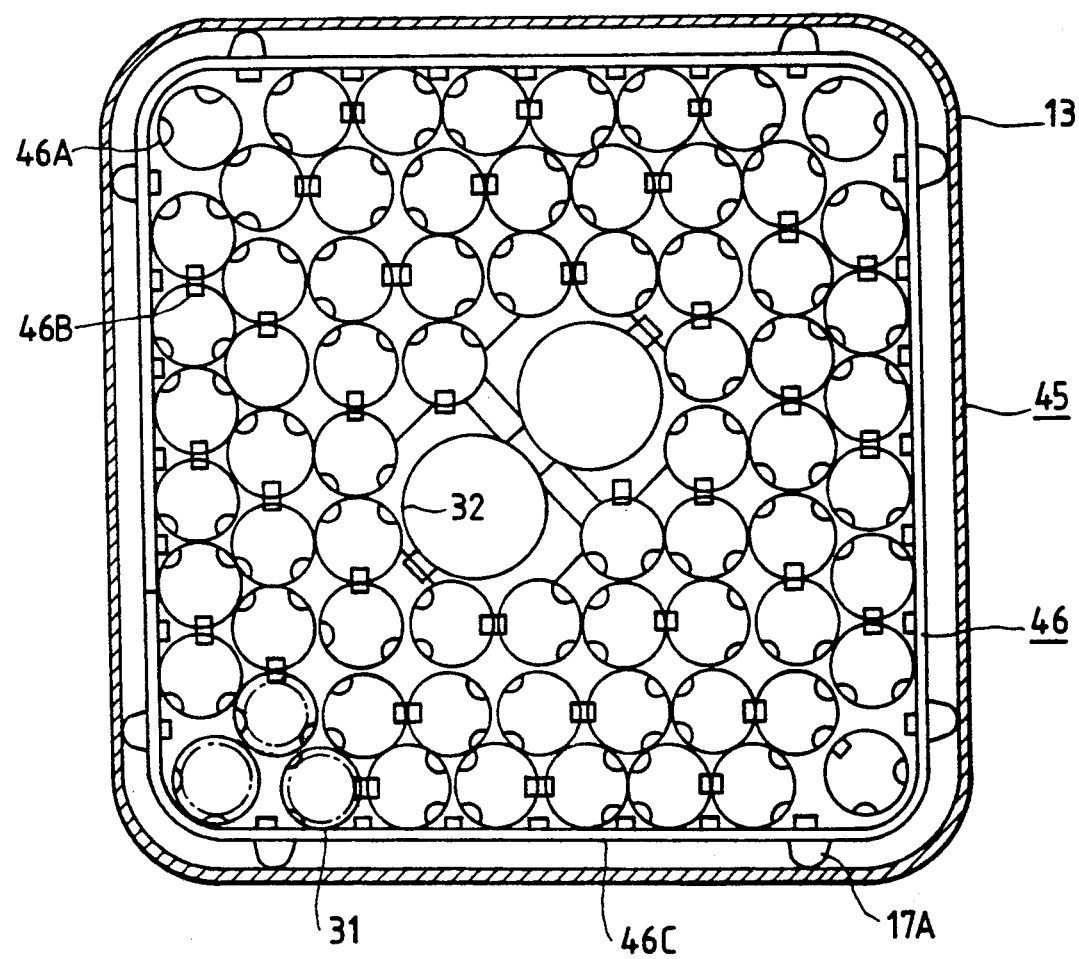

Another embodiment of the fuel assembly to be applied to the core shown in FIG. 1 is shown in FIG. 19. A fuel assembly 45 of the present embodiment is equipped with the fuel rods 31 and the water rods 32. The external diameter of the water rods 32 is smaller than that of the water rods 9. The fuel assembly 45 is arranged with the fuel rods 31 at the pitch $P_0$ similar to that of the fuel assembly 30. In the peripheral region of the fuel assembly 45, the fuel rods 31 are arranged in the form of a triangular lattice like the fuel assembly 5. Since the fuel rods 31 having an external diameter of about 10.6 mm are arranged in the triangular lattice form in the peripheral region, the increment (i.e., the solution of the equation (1)) of the distance $l_2$ between the axis of the fuel rods 31 in the outermost periphery and the inner face of the channel box 13 is left as it is in the outermost periphery. Thus, the fuel assembly 45 has its reactor shut-down allowance augmented more than the fuel assemblies 5 and 30 as a result of the augmentation of the spacing between the fuel rods 31 in the outermost periphery and the inner face of the channel box 13. In order to augment the reactor shut-down allowance more than the fuel assembly 30, the shortest distance $l_2$ between the axis of the fuel rods 31 arranged in the outermost periphery and the inner face of the channel box 13 has to satisfy the following formula (2), in case the thickness of the band 46C of a fuel spacer 46 is designated at $t_1$, that is to say, the fuel assembly 45 should satisfy the condition of the following formula (2):

$$l_2 > 2.6\, t_1 + P_0/2 \qquad (2)$$

The fuel rods 31 to be used may be exemplified by the fuel rods of three kinds 1 to 3 like the fuel assembly 5, although not shown. These fuel rods are arranged in the fuel assembly 45 as in the fuel assembly 5. The fuel spacer 46 used in the present embodiment has the same structure as that of the fuel spacer 10 excepting that it is wholly small-sized. Because of the necessity for satisfying the above-specified formula (2), in the present embodiment, the spacing between the inner face of the channel box 13 and the band 46C is larger than that of the fuel assembly 5. For this, there are provided bath tubs 17A which are higher than the bath tubs 17.

The fuel assembly 45 can have a higher reactor shut-down allowance than that of the fuel assembly 5. However, the charge of the nuclear fuel substance in the fuel assembly 45 is less than that of the fuel assembly 5. Excepting these, the effects obtained in the fuel assembly 5 are attained in the fuel assembly 45, too.

The fuel assemblies 40 and 45 reside in the core for the three fuel cycles like the fuel assembly 5.

The fuel assemblies 5, 40 and 45 containing the fuel rods 1 to 3 and having the high average enrichments are charged as the fuel assemblies for replacement into the core of the boiling water reactor to constitute an equilibrium core. The fuel assemblies 5, 40 and 45 can also constitute the initial charge core of the boiling water reactor.

An embodiment of the intial charge core including the fuel assembly 5 will be described in the following. The initial charge core of the present embodiment applies the concept of that shown in FIG. 1 of Japanese Patent Laid-Open No. 165682/1986. Moreover, the initial charge core of the present embodiment can effect a prompt transfer to the equilibrium cycle (i.e., equilibrium core) and can augment the take-out degree of burn-up of the fuel assembly initially charged. Incidentally, the core of the reactor shown in FIG. 1 belongs to the equilibrium core.

The initial loaded core of the present embodiment is featured by the following six points:

① The initial loaded core is constituted by two or more kinds (e.g., three kinds) of fuel assemblies 5 having different average enrichments.

② The number of kinds of the fuel assemblies is determined to N if the replacement frequency of the fuel assemblies 5 after one fuel cycle is designated at 1/N.

③ In the first fuel cycle, discharged exposure is increased more by one corresponding to the starting test period than that of each of subsequent fuel cycles. Therefore, the cycle-augmented exposure is compensated by making the number of the highly enriched fuel assemblies in the initial loaded core more than that of the fuel assemblies (i.e., the replacement fuels) to be taken out from the core for replacement of the equilibrium core.

④ The four fuel assemblies in the control cell are lowly enriched fuel assemblies L1.

⑤ The enrichment of the fuel assemblies L1 is within a range of about 1.6 to 2.4 wt. %.

⑥ The enrichment of the highest fuel assemblies (which will be called the "highly enriched fuel assemblies") of the fuel assemblies 5 constituting the initial loaded core is equal to that of new fuel assemblies to be loaded into the core in place of the replacement fuels.

The requisite ① is basic for realizing the initial loaded core simulating the equilibrium core to quicken the transfer to the equilibrium core. Moreover, the requisite ① constitutes to the augmentation of the discharged exposure if the manner to discharge the fuel assemblies, as described in the requisite ④, is taken into consideration.

These requisites are not sufficient for achieving the effects of the present embodiment but have to be supplemented by the following techniques.

According to the requisite ②, the number of the kinds of the fuel assemblies 5 (which will be called the "initial loaded fuel") to be initially loaded at the end of the first fuel cycle is substantially equal to that of the batches of the equilibrium core. This smoothes the transfer from the initial loaded core to the equilibrium core.

If the total loaded number of the fuel assemblies 5 is designated at $N_I$ and if the number of the fuels to be replaced is designated at $N_R$, the batch number (which is defined as a reciprocal of the number ratio of the replacement fuels) is expressed by $N_I/N_R$. In order that the kind n of the average enrichment of the initial loaded fuel may be equalized to the batch number according to the requisite ②, it is sufficient to select the kind n from an integer satisfying the following formula (3):

$$n \leq \frac{N_I}{N_R} < n + 1. \tag{3}$$

In other words, the following formula (4) holds between the number $N_R$ of the replacement fuels and the kind n of the average enrichment:

$$\frac{N_I}{n+1} < N_R \leq \frac{N_I}{n}. \tag{4}$$

The requisite ③ is determined by the following principle.

Figure 20:
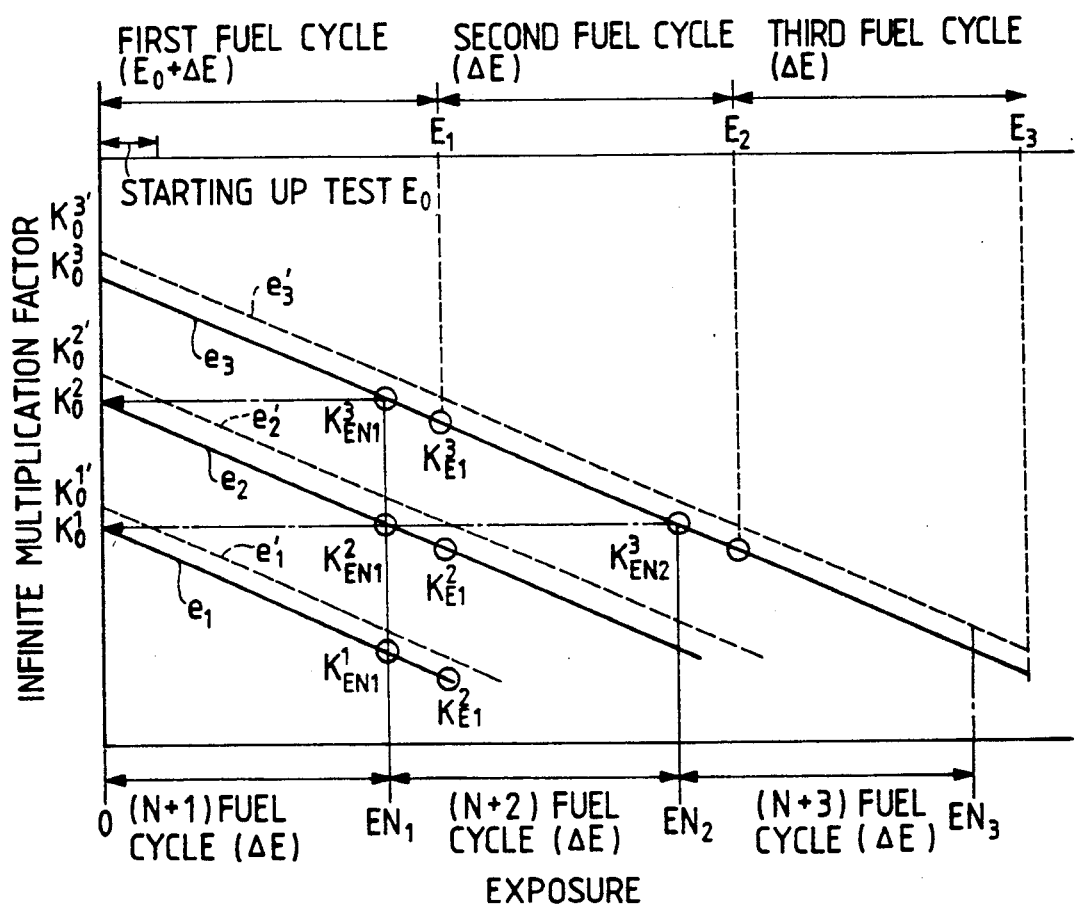
FIG. 20 is a characteristic diagram showing the relations between the enrichment and the infinite multiplication factor.

Generally speaking, the infinite multiplication factor is approximated by a linear expression of the degree of burn-up. FIG. 20 schematically shows the relations between the infinite multiplication factor and the degree of burn-up. A straight line indicated at e3 plots the characteristics in the third batch core. Specifically, the characteristics e3 show the relations between the degree of burn-up in the equilibrium core, in which one third fuel assemblies 5 in the core are replaced at the end of each fuel cycle, and the infinite multiplication factor. The infinite multiplication factor of the new fuel assembly 5, which is charged in the core in the (N+1)th fuel cycle, has a value of $K_0$ because the degree of burn-up is zero. At the end of the (N+1)th fuel cycle, the degree of burn-up of the fuel assembly 5 is at $E_{N1}$ so that the infinite multiplication factor takes a value $K_{EN1}{}^3$. Likewise, the infinite multiplication factor of the fuel assembly 5 is $K_{EN2}{}^3$ the end of the (N+2)th fuel cycle and $K_{EN3}{}^3$ at the end of the (N+3)th fuel cycle, i.e., when the fuel assembly 5 is to be taken out. Supposing the equilibrium cycle, the numbers of the replacement fuels at the individual fuel cycles are equal so that all the cycle-augmented burn-up degrees $\Delta E$ of the individual fuel cycles are equal. At the ends of the individual fuel cycles, the fuel assemblies 5 having the infinite multiplication factors $K_{E1}{}^3$, $K_{E2}{}^3$ and $K_{E3}{}^3$ existing are in an equal number so that the average infinite multiplication fact of the core is expressed by their average. It is sufficient that the average infinite multiplication factor be critical.

In order to realize such equilibrium core from the initial charge core, it is sufficient to charge the core with an equal number of: the fuel assemblies having an average enrichment expressed by characteristics e2 equal to the infinite multiplication factor $K_{EN1}{}^3$ at the zero burn-up degree; the fuel assemblies having an average enrichment expressed by characteristics e1 equal to the infinite multiplication factor $K_{EN2}{}^3$ at the zero burn-up degree; and the fuel assemblies of the characteristics e3.

Since the initial charge core has a start-up test, however, the burn-up degree E of the first fuel cycle is higher than those of the subsequent fuel cycles. If the initial charge core is loaded with the fuel assemblies 5 of the characteristics e3, the infinite multiplication factor at the end of the first fuel cycle takes the value $K_{E1}{}^3$ lower than $K_{EN1}{}^3$ by $\Delta K$. These situations are similar for the characteristics e2 and e1. As a result, the critical state cannot be maintained at the individual terminals of the first fuel cycle to the third fuel cycle.

For these counter-measures, it is conceivable to use the fuel assemblies of characteristics e3', which are enriched so that the infinite multiplication factor at a burn-up degree $E_1$ may be equal to the infinite multiplication factor $E_{EN1}{}^3$ of the fuel assemblies of the characteristics e3. Likewise, the fuel assemblies of characteristics e1' and e2' are used. It is not preferable that the fuel assemblies of characteristics e3' have an average enrichment higher than that of the new fuel assemblies 5 for replacement.

Therefore, the number of the fuel assemblies of the highest enrichment to be initially charged may be larger than the number of other fuel assemblies so as to compensate the burn-up degree increment at the start-up test by equalizing the average enrichment of the fuel assemblies of the highest enrichment charged in the initial charge core to that of the new fuel assemblies for replacement.

In this case, the number $\Delta N$ for compensating the start-up period $E_0$ is expressed by the following equation if the number of the replacement fuels in the equilibrium cycle is designated at $N_R$ and if the cycle-augmented degree of burn-up is designated at $\Delta E$:

From $\Delta N/E_0 = N_R/\Delta E$, $$\Delta N = N_R \cdot E_0 / \Delta E \qquad (5)$$

Hence, the number $N_n$ of the fuel assemblies of the highest enrichment is expressed from the equation (5) by the following equation:

$$N_n = N_R + \Delta N$$
$$= N_R \left(1 + \frac{E_0}{\Delta E}\right)$$

Here:

$$\frac{E_0}{\Delta E} = \alpha = \frac{E_1 - E_N}{E_N}$$

wherein:

$E_1$: the cycle-augmented burn-up degree of the first fuel cycle; and $E_N$: the average cycle-augmented burn-up degree on or after the second fuel cycle.

The cycle-augmented burn-up degree means the burn-up degree which is obtained for one fuel cycle. If the relation of the equation (4) is used, the relation between the number n of the average enrichment and the number $N_n$ is expressed by the following formula:

$$\frac{N(1 + \alpha)}{n + 1} < N_n \leq \frac{N(1 + \alpha)}{n}. \qquad (6)$$

If the number of the fuel assemblies is thus determined, the number of fuel assemblies to be replaced in a transfer cycle can be made constant to effect a prompt transfer to the equilibrium cycle.

The requisite ④ is necessary, as disclosed in FIG. 1 of U.S. Pat. No. 4,378,329, to restrict the control rods to be inserted into the core during the run to eliminate the pattern exchange of the control rods. For this run, the four fuel assemblies in the control cell must be those of low reactivity.

The requisite ⑤ is featured, as follows.

The burn-up degree of the first fuel cycle has to be determined taking the start-up test period into consideration.

Since the burn-up degree required of the lightly enriched fuel assemblies to be taken out at the end of the first fuel cycle is at least about 18.3 GWd/t, the average enrichment is desired to be about 1.6 wt. %. Since it is conceivable the burn-up degree of the first fuel cycle is also increased as a result of the elongation of the running period scheduled from now on, the enrichment of the lightly enriched fuels is suitably at about 1.6 wt. % to 2.4 wt. %.

If the average enrichment of the highly enriched fuel assemblies is equalized to that of the new fuel assemblies for replacement, as has been described in the requisite ⑥, the structure of the initial charge core resembles the core structure of the equilibrium cycle. As a result, the transfer from the initial charge core to the equilibrium core is speeded up.

Figure 21:
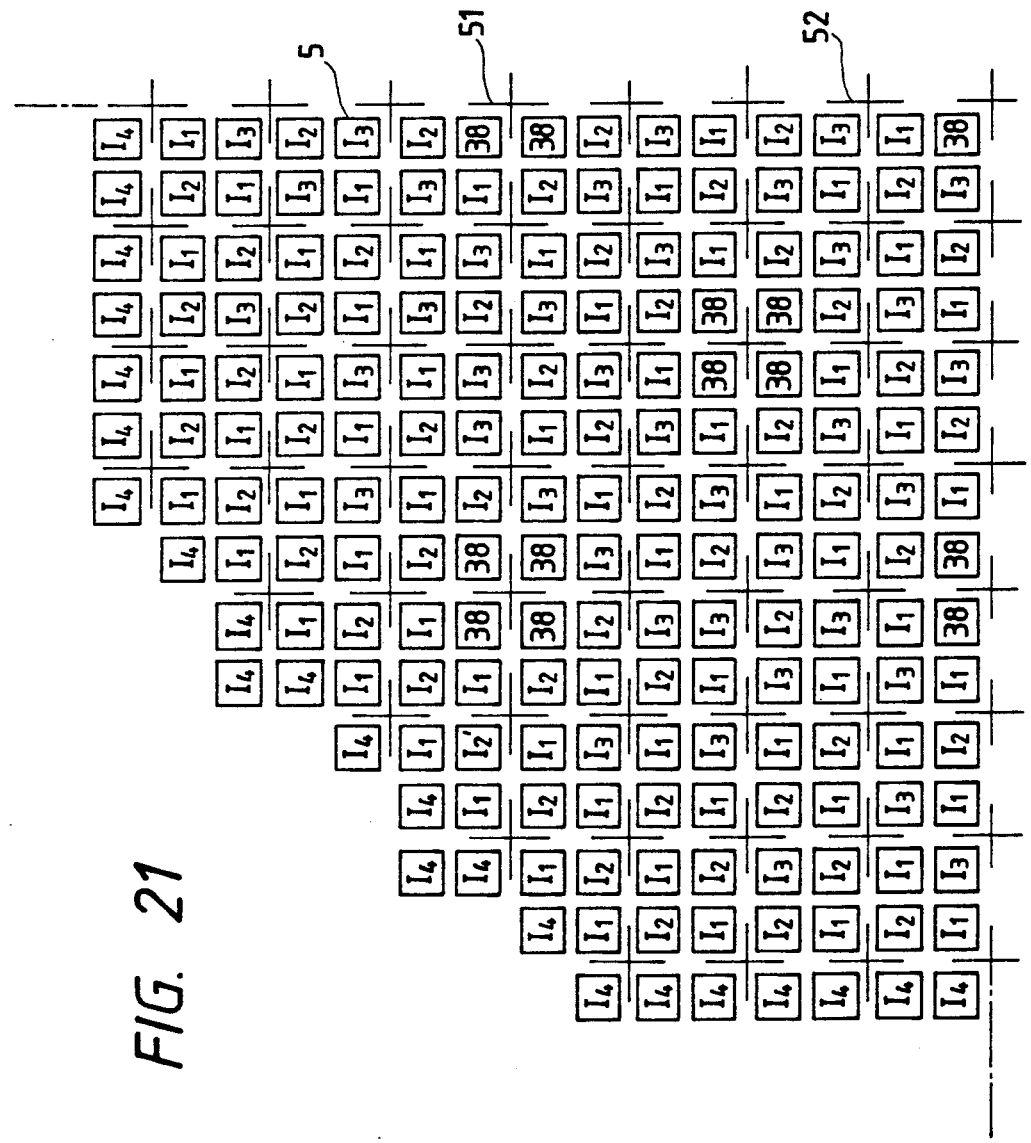
FIG. 21 is a diagram showing the structure of an initial inventory core according to another embodiment of the present invention.

One example of the initial charge core according to the present embodiment thus far described will be explained in the following. FIG. 21 is a top plan view showing one quarter of the initial charge core of the boiling water reactor of 1,100 MWe class. The components shared with those of FIG. 1 are designated at the same reference characters. All the fuel assemblies to be charged in the initial charge core of the present embodiment use the aforementioned structure of the fuel assemblies 5, although the average enrichment is partially different. The fuel assemblies 5 to be used in the present embodiment are classified into three kinds in dependence upon the difference in the average enrichment. The present embodiment is exemplified by seven hundreds and sixty four fuel assemblies 5 charged in the core and two hundreds and twelve equilibrium cores for average replacement. The number 3 is selected as the maximum integer not exceeding the value 3.6 (=764/212) obtained from the equation (4) for that of the kinds of the fuel assemblies 5. The fuel assemblies 5 as indicated at $I_1$ in FIG. 21 are highly enriched fuel assemblies which have an average enrichment of about 4.7 wt. % equal to that of the aforementioned new fuel assemblies 5 for replacement. The charge number of the fuel assemblies 5 indicated at $I_1$ is two hundreds and forty eight. The fuel assemblies 5 indicated at $I_2$ are those of medium enrichment having an average enrichment of about 3.8 wt. % and in the number of two hundreds and twelve. The remaining fuel assemblies 5, as indicated at $I_3$, $I_4$ and 38, are those of low enrichment having an average enrichment of about 2.2 wt. %. The fuel assemblies 5 indicated at $I_4$ are arranged in the outermost periphery of the core. The fuel assemblies 5 indicated at 38 are arranged around the control rods 51 to constitute the control cells. The total number of the fuel assemblies 5 indicated at $I_3$ and 38 to be arranged in the central portion of the core is two hundreds and twelve. These fuel assemblies 5 are taken out from the core at the end of the run of the first fuel cycle. Moreover, the number of the fuel assemblies 5 indicated at $I_4$ is thirty nine.

The initial charge core thus constructed of those fuel assemblies 5 indicated at $I_1$ to $I_4$ and 38 is subjected to a fuel exchange, as will be described in the following, and transferred to the equilibrium core. First of all, if the run of the first fuel cycle is ended, two hundreds and twelve fuel assemblies 5 indicated at $I_3$ and 38 are taken out from the core and replaced by the new fuel assemblies 5 for replacement having an average enrichment of about 4.7 wt. %.

In this case, the arrangements of the fuel assemblies are exchanged (or shuffled), if necessary. This shuffling is accomplished with a view to accelerate the transfer of the target equilibrium core. The reason why the fuel assemblies 5 indicated at $I_4$ and arranged at the outermost periphery of the core are not taken out at this time has been described hereinbefore. As a result, the degree of burn-up of the fuel assemblies arranged in the outermost periphery of the core can be augmented. As a result, the fuel assemblies taken out at the end of the first fuel cycle always have a small amount of uranium 235 left.

At the end of the second fuel cycle run, ninety two fuel assemblies 5 at $I_4$ arranged in the outermost periphery of the core and one hundred and twenty fuel assemblies at $I_2$ are taken out from the core. The core is newly charged with two hundreds and twelve new fuel assemblies 5 having an average enrichment of about 4.7 wt. %. Likewise, at the end of the third fuel cycle run, the remaining ninety two fuel assemblies 5 at $I_2$ and one hundred and twenty fuel assemblies at $I_1$ are replaced by two hundred and twelve new fuel assemblies 5 having an average enrichment of about 4.7 wt. %. The core thus constituted at the start of the fourth fuel cycle is the equilibrium core, i.e., identical to that in the fourth or later fuel cycle, in which two hundreds and twelve fuel assemblies 5 are replaced every year.

The number of replacement at the ends of the first to third fuel cycles of the fuel assemblies 5 charged into the initial charge core is constant at two hundreds and twelve. Since the fuel assemblies always having little uranium 235 left are always taken out from the core, the replacement of such fuel assemblies 5 can utilize the uranium at all times to improve the fuel economy.

Only in the fuel cycle, the degree of burn-up is increased more by that of the start-up test period than those of the first and second fuel cycles. However, little change occurs in the excess reactivity for the burn-up degree in the first to third fuel cycles. Especially, the change in the excess reactivity for the burn-up degree in the third or later fuel cycles is identical so that the core comes into the equilibrium state. This prompt convergence to the equlibrium core is accomplished because the numbers of the fuel assemblies to be replaced in the first and later fuel cycles are equal, as has been described above.

In the present embodiment, the average take-out degree of burn-up is increased, if compared for an equal initial core average density.

In the present embodiment, moreover, the individual fuel cycles are flat with less burning change for the excess reactivity so that the single pattern run utilizing only the control rods 51 in the control cell can be accomplished from the first fuel cycle.

We claim:

1. A reactor core loaded with a plurality of fuel assemblies, each fuel assembly comprising a channel box having a substantially square cross-section, a central region having a plurality of fuel rods arranged in the form of a square lattice with sides extending substantially parallel to side walls of said channel box and being disposed in said channel box, at least one water rod disposed between and adjacent to said fuel rods in said central region, and a peripheral region having a plurality of fuel rods in the form of a triangular lattice, said peripheral region surrounding said central region and being disposed in said channel box.

2. A fuel assembly comprising a channel box having a substantially square cross-section, a central region having a plurality of fuel rods arranged in the form of a square lattice with sides extending substantially parallel to side walls of said channel box and being disposed in said channel box, at least one water rod disposed between and adjacent to said fuel rods in said central region, and a peripheral region having a plurality of fuel rods arranged in the form of a triangular lattice and surrounding said central region and being disposed in said channel box.

3. A fuel assembly according to claim 2, wherein a majority of said fuel rods in said peripheral region are arranged at the same pitch as that of said fuel rods in said central region.

4. A fuel assembly comprising a channel box having a substantially square cross-section, a central region having a plurality of fuel rods arranged in the form of a square lattice with sides extending substantially parallel to side walls of said channel box and being disposed in said channel box, at least one water rod disposed between and adjacent to said fuel rods in said central region, and a peripheral region having a plurality of fuel rods arranged so as to be disposed between adjacent ones of said fuel rods of said central region, said peripheral region surrounding said central region and being disposed in said channel box.

5. A fuel assembly according to claim 4, wherein a majority of said fuel rods in said peripheral region are arranged at the same pitch as that of said fuel rods in said central region.

6. A fuel assembly according to claim 2, wherein a spacing between an array of fuel rods in said central region is larger than a spacing between an array of said fuel rods arranged in the form of said triangular lattice and an array of remaining ones of said fuel rods adjacent to the former array.

7. A fuel assembly according to claim 2, wherein two water rods are provided in said central region, each water rod having a diameter larger than the pitch of said fuel rods arranged in said central region, said two water rods being arranged adjacent to one another in a portion of said central region having a size for accommodating seven of said fuel rods.

8. A fuel assembly according to claim 7, wherein said fuel rods arranged adjacent to said two water rods are first fuel rods having an infinite multiplication factor smaller than said fuel rods adjacent to said first fuel rods and being second fuel rods.

9. A fuel assembly according to claim 8, wherein said first fuel rods have an average enrichment lower than an average enrichment of said second fuel rods.

10. A fuel assembly according to claim 2, wherein two water rods are provided adjacent to one other in said central region so as to form a slowing-down region having a total cross-section area which is 7 to 12 times as large as the cross-sectional area of one of said fuel rods.

11. A fuel assembly according to claim 2, further comprising a fuel spacer for holding mutual spacings of said fuel rods in said central region and said peripheral region, said channel box surrounding a bundle of said fuel rods held by said fuel spacer, wherein the shortest distance l between an axis of said fuel rods arranged at an outermost periphery and an inner face of said channel box satisfies the following formula, if the pitch of said fuel rods is designated by P and if the thickness of a band of said fuel spacer at an outer periphery thereof is designated by t:

$$l = 2.6t + P/2.$$

12. A fuel assembly according to claim 2, further comprising a fuel spacer for holding mutual spacings of said fuel rods in said central region and said peripheral region, said channel box surrounding a bundle of said fuel rods held by said fuel spacer, wherein a shortest distance l between an axis of said fuel rods arranged at an outermost periphery and an inner face of said channel box satisfies the following formula, if the pitch of said fuel rods is designated by P and if the thickness of a band of said fuel spacer at an outer periphery thereof is designated by t:

$$l > 2.6t + P/2.$$

13. A fuel assembly according to claim 2, further comprising a fuel spacer having a plurality of cylindrical members for supporting said fuel rods in said central region and said peripheral region.

14. A fuel assembly according to claim 7, further comprising a binding member for connecting said two water rods.

15. A fuel assembly according to claim 7, further comprising a fuel spacer for holding mutual spacings of said fuel rods, said fuel spacer including a plurality of cylindrical members for receiving said fuel rods, spacing holding members attached to said cylindrical members adjacent to said two water rods and contacting said water rods, respectively, and a support member mounted on one of said two water rods for supporting said spacing holding members.

16. A fuel assembly according to claim 14, further comprising a fuel spacer for holding mutual spacings of said fuel rods, said fuel spacer including a plurality of cylindrical members for receiving said fuel rods, fuel spacer support members attached to said cylindrical members facing said water rods and supported by said binding member mounted on said water rods.

17. A fuel spacer comprising a central region having a plurality of cylindrical members for receiving fuel rods arranged in the form of a square lattice and including a space surrounded by the cylindrical members for receiving at least one water rod, and a peripheral region having a plurality of cylindrical members for receiving fuel rods arranged in the form of a triangular lattice and surrounding said central region.

18. A fuel spacer comprising a first cylindrical member group having a plurality of cylindrical members arranged in the form of a square lattice and connected with each other and including a space surrounded by the cylindrical members for receiving at least one water rod, and a second cylindrical member group having a plurality of other cylindrical members inserted partially between the cylindrical members of said first cylindrical member group and positioned at an outermost peripheral region outwardly of said first cylindrical member group and connected to the cylindrical members of said first cylindrical group and connected with the other cylindrical members of said second cylindrical group.

19. An initial loaded core for a reactor loaded with a plurality of fuel assemblies, each fuel assembly including a channel box having a substantially square cross-section, a central region having a plurality of fuel rods arranged in the form of a square lattice having sides substantially parallel to side walls of said channel box and being disposed in said channel box, at least one water rod disposed between and adjacent said fuel rods in said central region, and a peripheral region having a plurality of fuel rods arranged in the form of a triangular lattice and surrounding said central region and being disposed in said channel box, wherein average enrichment of said fuel assemblies arranged for removal from the core after completion of a first fuel cycle is lower than an average enrichment of said fuel assemblies arranged for removal from the core after completion of second and third fuel cycles.

20. An initial loaded core for a reactor loaded with a plurality of fuel assemblies and control rods, each of said fuel assemblies including a channel box having a substantially square cross-section, a central region having a plurality of fuel rods arranged in the form of a square lattice having sides substantially parallel to side walls of said channel box and disposed in said channel box, at least one water rod disposed between and adjacent said fuel rods in said central region, and a peripheral region having a plurality of fuel rods arranged in the form of a triangular lattice and surrounding said central region and disposed in said channel box, wherein said fuel assemblies loaded in two said cores are classified into a plurality of groups with respect to average enrichments thereof so that the average enrichments of said fuel assemblies of respective groups are higher in the order of the first, second ... and n-th groups, and wherein the number Nn of said fuel assemblies of the n-th group have the highest average enrichment and satisfies the following formula, if the total number of said fuel assemblies loaded in said core is designated by $N_t$, if the cycle-augmented exposure in the first fuel cycle is designated by $E_1$ and if the average cycle-augmented exposure of the second and later fuel cycles is designated by $E_N$, $$\frac{N_t(1+\alpha)}{n+1} \leq N_n \frac{N_t(1+\alpha)}{n}$$

wherein $\alpha = \dfrac{E_1 - E_N}{E_N}$.

* * * * *